(12) United States Patent
Noh et al.

(10) Patent No.: US 11,950,108 B2
(45) Date of Patent: Apr. 2, 2024

(54) REUSING RESOURCES IN A WIRELESS RELAY

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Seung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 48 days.

(21) Appl. No.: 17/539,885

(22) Filed: Dec. 1, 2021

(65) Prior Publication Data

US 2022/0174509 A1    Jun. 2, 2022

(30) Foreign Application Priority Data

Dec. 2, 2020  (KR) .......................... 10-2020-0166948
Dec. 1, 2021  (KR) .......................... 10-2021-0170375

(51) Int. Cl.
*H04W 16/28*    (2009.01)
*H04W 56/00*    (2009.01)
(Continued)

(52) U.S. Cl.
CPC ......... *H04W 16/28* (2013.01); *H04W 56/001* (2013.01); *H04W 72/02* (2013.01);
(Continued)

(58) Field of Classification Search
CPC ... H04W 16/28; H04W 72/51; H04W 56/001; H04W 72/02; H04W 72/046;
(Continued)

(56) References Cited

U.S. PATENT DOCUMENTS 9,319,127 B2   4/2016   Kim et al.
10,827,327 B2  11/2020  Wang et al.
(Continued)

FOREIGN PATENT DOCUMENTS

KR   10-0745086 B1   8/2007
WO   2016/159007 A1  10/2016
(Continued)

*Primary Examiner* — Ian N Moore
*Assistant Examiner* — Latresa A McCallum
(74) *Attorney, Agent, or Firm* — LRK PATENT LAW FIRM

(57) ABSTRACT

An operation method of a repeater relaying wireless communications between a base station and at least one terminal in a communication system may include: transmitting, to the base station, a first capability report including information on beam-related capability supported by the repeater; transmitting, to the base station, a first request signal for requesting to perform first configuration for coverage extension of the repeater; receiving, from the base station, information on the first configuration configured based on the first capability report and the first request signal; and relaying the wireless communications between the base station and the at least one terminal based on one or more beams formed based on the received first configuration.

13 Claims, 24 Drawing Sheets

(51) Int. Cl.
*H04W 72/02* (2009.01)
*H04W 72/044* (2023.01)
*H04W 72/51* (2023.01)
*H04W 74/0833* (2024.01)

(52) U.S. Cl.
CPC ......... *H04W 72/046* (2013.01); *H04W 72/51* (2023.01); *H04W 74/0841* (2013.01)

(58) Field of Classification Search
CPC H04W 74/0841; H04W 16/26; H04B 7/0628; H04B 7/0695; H04B 7/15528; H04L 5/0023; H04L 5/0048; H04L 5/0094; H04L 5/0007
See application file for complete search history.

(56) References Cited

U.S. PATENT DOCUMENTS

| | | |
|---|---|---|
| 2011/0053496 A1 | 3/2011 | Hui et al. |
| 2018/0110037 A1 | 4/2018 | Yasukawa et al. |
| 2018/0115362 A1 | 4/2018 | Yasukawa et al. |
| 2019/0306678 A1 | 10/2019 | Byun et al. |
| 2020/0358567 A1* | 11/2020 | Moshfeghi ............. H04B 7/024 |
| 2021/0045074 A1* | 2/2021 | Manolakos ........... H04L 5/0057 |
| 2021/0058138 A1 | 2/2021 | Tani et al. |
| 2022/0053433 A1* | 2/2022 | Abedini ................ H04W 16/28 |

FOREIGN PATENT DOCUMENTS

| | | |
|---|---|---|
| WO | 2019/229827 A1 | 12/2019 |
| WO | 2020/033609 A1 | 2/2020 |

\* cited by examiner

FIG. 10

| CORESET pool ID | serving cell ID | | | | | | BWP ID | | Oct 1 |
|---|---|---|---|---|---|---|---|---|---|
| $T_7$ | $T_6$ | $T_5$ | $T_4$ | $T_3$ | $T_2$ | $T_1$ | $T_0$ | | Oct 2 |
| $T_{15}$ | $T_{14}$ | $T_{13}$ | $T_{12}$ | $T_{11}$ | $T_{10}$ | $T_9$ | $T_8$ | | Oct 3 |
| ... | | | | | | | | | |
| $T_{(N-2) \times 8+7}$ | $T_{(N-2) \times 8+6}$ | $T_{(N-2) \times 8+5}$ | $T_{(N-2) \times 8+4}$ | $T_{(N-2) \times 8+3}$ | $T_{(N-2) \times 8+2}$ | $T_{(N-2) \times 8+1}$ | $T_{(N-2) \times 8}$ | | Oct N |

REUSING RESOURCES IN A WIRELESS RELAY

CROSS-REFERENCE TO RELATED APPLICATIONS

This application claims priority to Korean Patent Applications No. 10-2020-0166948 filed on Dec. 2, 2020 and No. 10-2021-0170375 filed on Dec. 1, 2021 with the Korean Intellectual Property Office (KIPO), the entire contents of which are hereby incorporated by reference.

BACKGROUND

1. Technical Field

The present disclosure relates to a technique for transmitting and receiving signals in a wireless communication system, and more particularly, to a signal transmission and reception technique for transmitting and receiving signals using a wireless relay for coverage extension.

2. Description of Related Art

With the development of information and communication technology, various wireless communication technologies are being developed. Representative wireless communication technologies include long term evolution (LTE) and new radio (NR) defined as the 3rd generation partnership project (3GPP) standards. The LTE may be one of 4th generation (4G) wireless communication technologies, and the NR may be one of 5th generation (5G) wireless communication technologies.

In order to process rapidly increasing wireless data, the 5G NR communication or later wireless communication technology may support communications in a relatively high frequency band. For example, a radio frequency band used for wireless communication may be largely divided into a frequency range 1 (FR1) band and a frequency range 2 (FR2) band. Here, the FR1 band may mean a relatively low frequency band of 6 GHz or below. The FR2 band may mean a relatively high frequency band of 6 GHz or above. For example, the FR2 band may include a 28-29 GHz band, a millimeter wave or a terahertz wave band, and the like.

A wireless repeater may refer to a communication node for relaying radio signals transmitted and received between different communication nodes. The repeater may also be referred to as a 'relay'. In the FR1 band, since beamforming at a transceiver end based on a multi-antenna system is not essential, a simple amplify-and-forward (AF) repeater may be mainly used. On the other hand, in the FR2 band, beam-based radio signal transmission and reception are essential to overcome a high level of pathloss. When a radio signal is relayed between a base station and a terminal by using a simple AF repeater in the FR2 band, there may be a problem in that a cost (such as radio resources or time) for acquiring information on a beam used in a path from the base station to the terminal through the repeater is excessively increased due to absence of specifications for managing a transmission beam and/or a reception beam. In addition, when using a simple AF repeater in the FR2 band to relay a radio signal between the base station and the terminal, it is impossible to specifically manage and/or adjust the beam of the repeater by the base station, and thus performance degradation may occur. Accordingly, a technique for effectively relaying a beam-based radio signal transmitted and received between the base station and the terminal in the FR2 band may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a signal transmission and reception method and an apparatus therefor to improve a beam-based wireless signal relaying performance through a wireless repeater in a wireless communication system.

According to an exemplary embodiment of the present disclosure for achieving the above-described objective, an operation method of a repeater relaying wireless communications between a base station and at least one terminal in a communication system may comprise: transmitting, to the base station, a first capability report including information on beam-related capability supported by the repeater; transmitting, to the base station, a first request signal for requesting to perform first configuration for coverage extension of the repeater; receiving, from the base station, information on the first configuration configured based on the first capability report and the first request signal; and relaying the wireless communications between the base station and the at least one terminal based on one or more beams formed based on the received first configuration.

The first capability report may include at least one of information on a number of supportable beams on a communication path between the base station and the at least one terminal, information on supportable beam directions, or information on supportable beam widths.

The first configuration may correspond to a transmission configuration information (TCI)/quasi and co-located (QCL) configuration or a synchronization signal and physical broadcast channel block (SSB)/channel state information reference signal (CSI-RS) configuration; and the first request signal may include at least one of information on a direction of a beam requiring the coverage extension, and information on a number of the at least one terminal supported by the repeater.

The relaying may comprise: transmitting, to the at least one terminal, information of one or more target reference signals (RSs) configured based on the first configuration; and receiving, from the at least one terminal, an uplink signal transmitted based on the one or more target RSs.

The first configuration may indicate a mapping relationship between information on a first beam of the base station and information on a second beam of the repeater.

The first configuration may correspond to spatial relation information configuration; and the first request signal may include at least one of information on a direction of a beam requiring the coverage extension, information on a number of the at least one terminal to be supported by the repeater, or information on one or more beams to be supported by the repeater.

The relaying may comprise: transmitting, to the at least one terminal, a plurality of signals respectively corresponding to a plurality of reference RSs configured based on the first configuration; and receiving, from the at least one terminal, an uplink signal transmitted through one spatial transmission (TX) filter selected based on reception results of the plurality of signals.

According to another exemplary embodiment of the present disclosure for achieving the above-described objective, an operation method of a repeater relaying wireless communications between a base station and a terminal in a communication system may comprise: requesting, from the base station, permission to reuse radio resources allocated to one or more beams of a plurality of beams of the base station for beamforming for a link between the repeater and the terminal; receiving, from the base station, a signal permitting to reuse radio resources allocated to one or more beams of the plurality of beams of the base station; obtaining reuse preference information for the plurality of beams of the base station, which is determined based on a signaling signal transmission/reception operation with the base station; receiving, from the base station, a first signal to be transmitted to the terminal; transmitting, to the terminal, the first signal by using a first radio resource used for transmission of the first signal; and transmitting, to the terminal, the first signal by using a second radio resource selected based on the determined reuse preference information.

The reuse preference information may include information on a reuse non-preferred beam index set, and the transmitting of the first signal to the terminal by using the second radio resource may comprise: identifying information on at least one beam that does not correspond to one or more indexes included in the reuse non-preferred beam index set among the plurality of beams of the base station; selecting a radio resource allocated to the at least one beam as the second radio resource; and transmitting, to the terminal, the first signal by using the selected second radio resource.

The reuse preference information may include information on a reuse preferred beam index set, and the transmitting of the first signal to the terminal by using the second radio resource comprise: identifying information on one or more beams corresponding to one or more indexes included in the reuse preferred beam index set among the plurality of beams of the base station; selecting a radio resource allocated to the one or more beams corresponding to the one or more indexes as the second radio resource; and transmitting, to the terminal, the first signal by using the selected second radio resource.

The obtaining of the reuse preference information may comprise: determining reuse preference for each of the plurality of beams of the base station; and transmitting, to the base station, the reuse preference information including information on the determined reuse preference for each of the plurality of beams through a first signaling signal.

The obtaining of the reuse preference information may comprise: receiving, from the base station, the reuse preference information determined by the base station through a second signaling signal; and identifying information on whether to prefer reuse for each of the plurality of beams, which is included in the reuse preference information.

The operation method may further comprise: receiving, from the terminal, a first report including information on a result of receiving the first signal; and transmitting the first report to the base station.

According to yet another exemplary embodiment of the present disclosure for achieving the above-described objective, a base station performing wireless communications with a terminal through relaying of a repeater in a communication system may comprise: a processor; a memory electronically communicating with the processor; and instructions stored in the memory, wherein when executed by the processor, the instructions may cause the base station to: receive, from the repeater, a request for permission to reuse radio resources allocated to one or more beams of a plurality of beams of the base station for beamforming for a link between the repeater and the terminal; transmit, to the repeater, a signal permitting reuse of the radio resources allocated to the one or more beams of the plurality of beams of the base station; obtain reuse preference information for the plurality of beams of the base station, which is determined based on a signaling signal transmission/reception operation with the repeater; transmit, to the repeater, a first signal to be transmitted to the terminal; receive, from the repeater, a first report including information on a result of reception of the first signal at the terminal; and based on comparison of the reuse preference information and information included in the first report, determine whether an interpretation change for the first report is required.

The reuse preference information may include information on a reuse non-preferred beam index set, and the instructions may further cause the base station to: compare a first beam index indicated by the first report with information of the reuse non-preferred beam index set; and when the first beam index is not included in the reuse non-preferred beam index set, determine that the interpretation change for the first report is required.

The reuse preference information may include information on a reuse preferred beam index set, and the instructions may further cause the base station to: compare a first beam index indicated by the first report with information of the reuse preferred beam index set; and when the first beam index is included in the reuse preferred beam index set, determine that the interpretation change for the first report is required.

The instructions may further cause the base station to: receive, from the repeater, the reuse preference information determined by the repeater through a first signaling signal; and identify information on whether to prefer reuse for each of the plurality of beams, which is included in the reuse preference information.

The instructions may further cause the base station to: determine whether to prefer reuse for each of the plurality of beams; and transmit, to the repeater, the reuse preference information including information on reuse preference determined for each of the plurality of beams through a second signaling signal.

According to an exemplary embodiment of the present disclosure, in a FR2 band or a high frequency band, a base station and a terminal can effectively perform beam-based radio signal transmission and reception based on relaying of a wireless repeater.

According to an exemplary embodiment of the present disclosure, beam management on a path from the base station to the terminal through the repeater can be efficiently performed based on a signal transmission/reception operation between the base station, the repeater, and the terminal. Therefore, beam-based radio signal relaying performance based on the repeater can be improved at low cost.

BRIEF DESCRIPTION OF DRAWINGS

FIG. 10 is a conceptual diagram illustrating an exemplary embodiment of a TCI state activation/deactivation MAC CE in a communication system.

DETAILED DESCRIPTION OF THE EMBODIMENTS

Figure 1:
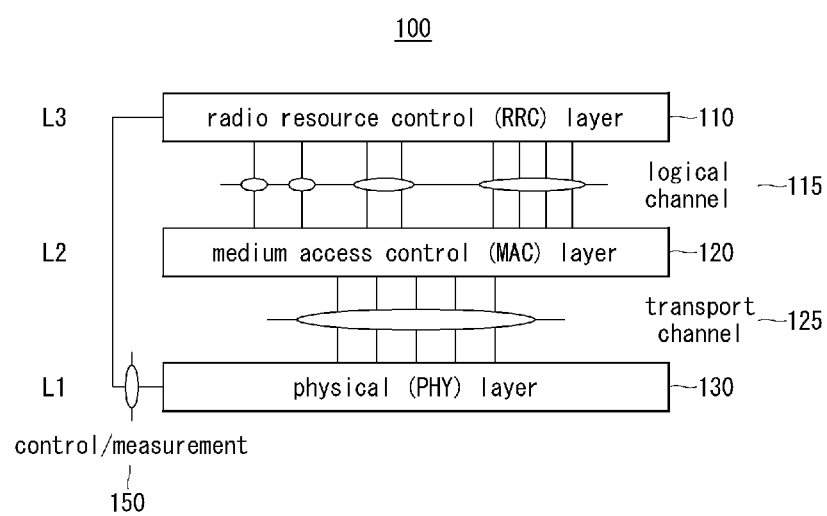
FIG. 1 is a conceptual diagram illustrating an exemplary embodiment of a radio interface protocol structure in a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a radio interface protocol structure in a communication system.

Referring to FIG. 1, an exemplary embodiment of a radio interface protocol structure 100 of a communication system may be configured to include a radio resource control (RRC) layer 110, a medium access control (MAC) layer 120, a physical (PHY) layer 130, and the like. An exemplary embodiment of the radio interface protocol structure 100 shown in FIG. 1 may correspond to various exemplary embodiments of interfaces such as an interface between a terminal and a base station, an interface between an IAB-node distributed unit (IAB-DU) and an IAB-node mobile terminal (IAB-MT) of an integrated access backhaul (IAB) network, an interface between an IAB-DU and a lower node, an interface between an IAB-MT and an upper node, an interface between a plurality of terminals, and the like.

In the vicinity of the PHY layer 130, the RRC layer 110, and the MAC layer 120, and the like may be disposed above the PHY layer 130. For example, the MAC layer 120 may be disposed above the PHY layer 130. The RRC layer 110 may be disposed above the MAC layer 120.

The MAC layer 120 may be connected to a higher layer (e.g., RRC layer 110) through logical channels 115. The PHY layer 130 may be connected to the higher MAC layer 120 through transport channels 125. The PHY layer 130 may transmit and receive control information or measurement information 150 to and from the RRC layer 110.

The PHY layer 130 may be referred to as a 'layer 1' or 'L1'. The MAC layer 120 may be referred to as a 'layer 2' or 12'. The RRC layer 110 may be referred to as a 'layer 3' or 13'. The RRC layer 110 and the MAC layer 120 may be collectively referred to as the 'higher layer'.

In the present disclosure, 'L1 signaling' refers to signaling such as downlink control information (DCI) transmitted on a physical downlink control channel (PDCCH), uplink control information (UCI) transmitted on a physical uplink control channel (PUCCH), and sidelink control information (SCI) transmitted on a physical sidelink control channel (PSCCH), which are channels of the PHY layer 130. Similarly, in the present disclosure, 'higher layer signaling' may include L2 signaling transmitted through a MAC control element (CE), L3 signaling transmitted through RRC signaling, and the like. Although omitted in FIG. 1 for convenience of description, information that can be included in an interface between base stations, or an interface (e.g., F1, next generation (NG) interfaces, etc.) between base station components such as a distributed unit (DU) and a central unit (CU) may also be collectively referred to as higher layer signaling as well as the L2 signaling or L3 signaling.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for the convenience of description, and exemplary embodiments of the numerologies used in the communication system may not be limited thereto. Each numerology μ may correspond to information of a subcarrier spacing (SCS) Δf and a cyclic prefix (CP). The terminal may identify a numerology μ and a CP value applied to a downlink bandwidth part (BWP) or an uplink BWP based on higher layer parameters such as subcarrier-Spacing, cyclicPrefix, and/or the like.

Figure 2:
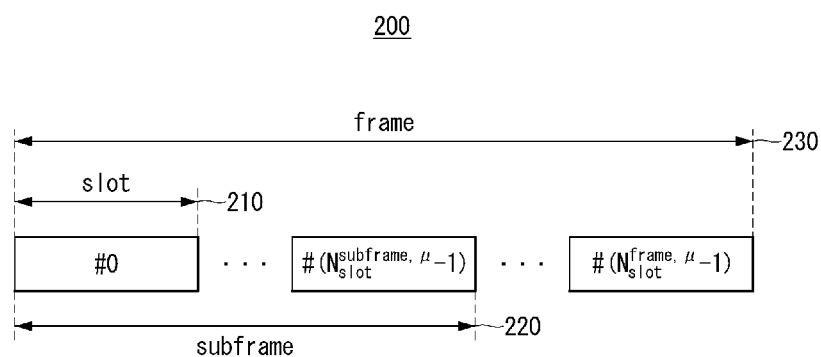
FIG. 2 is a conceptual diagram illustrating an exemplary embodiment of time resources in which radio signals are transmitted in a communication system.

FIG. 2 is a conceptual diagram illustrating an exemplary embodiment of time resources in which radio signals are transmitted in a communication system.

Referring to FIG. 2, time resources in which radio signals are transmitted in a communication system 200 may be represented with a frame 220 comprising one or more ($N_{slot}^{frame,\mu}/N_{slot}^{subframe,\mu}$) subframes, a subframe 220 comprising one or more ($N_{slot}^{subframe,\mu}$) slots, and a slot 210 comprising 14 ($N_{symb}^{slot}$) OFDM symbols. In this case, according to a configured numerology, as the values of $N_{symb}^{slot}$, $N_{slot}^{subframe,\mu}$, and $N_{slot}^{frame,\mu}$, values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the 5G NR communication system, the frame 230 may have a length of 10 ms, and the subframe 220 may have a length of 1 ms. Each frame 230 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

Figure 3:
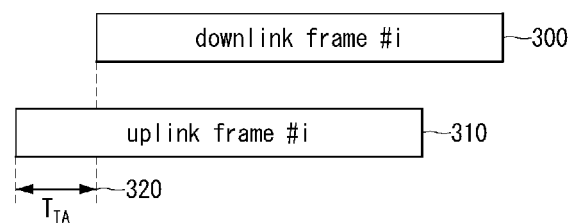
FIG. 3 is a conceptual diagram illustrating a time difference between a reception timing of an i-th downlink frame and a transmission timing of an i-th uplink frame in an exemplary embodiment of a communication system.

FIG. 3 is a conceptual diagram illustrating a time difference between a reception timing of an i-th downlink frame and a transmission timing of an i-th uplink frame in an exemplary embodiment of a communication system.

Referring to FIG. 3, a time difference between a reception timing of an i-th downlink frame 300 and a transmission timing of an i-th uplink frame 310 may be a $T_{TA}$ 320. Accordingly, the terminal may start transmission of the uplink frame #i 310 at a time earlier by $T_{TA}$ compared to the reception timing of the downlink frame #i 300. $T_{TA}$ may be referred to as a timing advance or timing adjustment TA. The base station may instruct the terminal to change a value of $T_{TA}$ through higher layer signaling or L1 signaling, and may configure the terminal to apply $T_{TA}$ in a manner defined as $T_{TA}=(N_{TA}+N_{TA,offset})T_c$. In the case of 5G NR, $T_c$ may be defined as $$T_c = \frac{1}{(\Delta f_{max} \cdot N_f)},$$

$\Delta f_{max}$ may be defined as $\Delta_{max}=480$ kHz, $N_f$ may be defined as $N_f=4096$, $N_{TA,offset}$ may be a value set by L3 signaling, and $N_{TA}$ may be a value determined by Equation 1 below by a value $T_A$ indicated by L2 signaling.

$$N_{TA} = \begin{cases} T_A \cdot 16 \cdot \frac{64}{2^\mu} & \text{(for random access response)} \\ N_{TA\_old} + ((T_A - 31) \cdot 16 \cdot 64 / 2^\mu) & \text{(for other cases)} \end{cases} \quad \text{[Equation 1]}$$

Here, the description on $N_{TA,offset}$ and $N_{TA}$ may be an example for a specific situation, and various other options may exist, but in order not to obscure the gist of the description, all possible cases may not be listed in the present disclosure.

Figure 4:
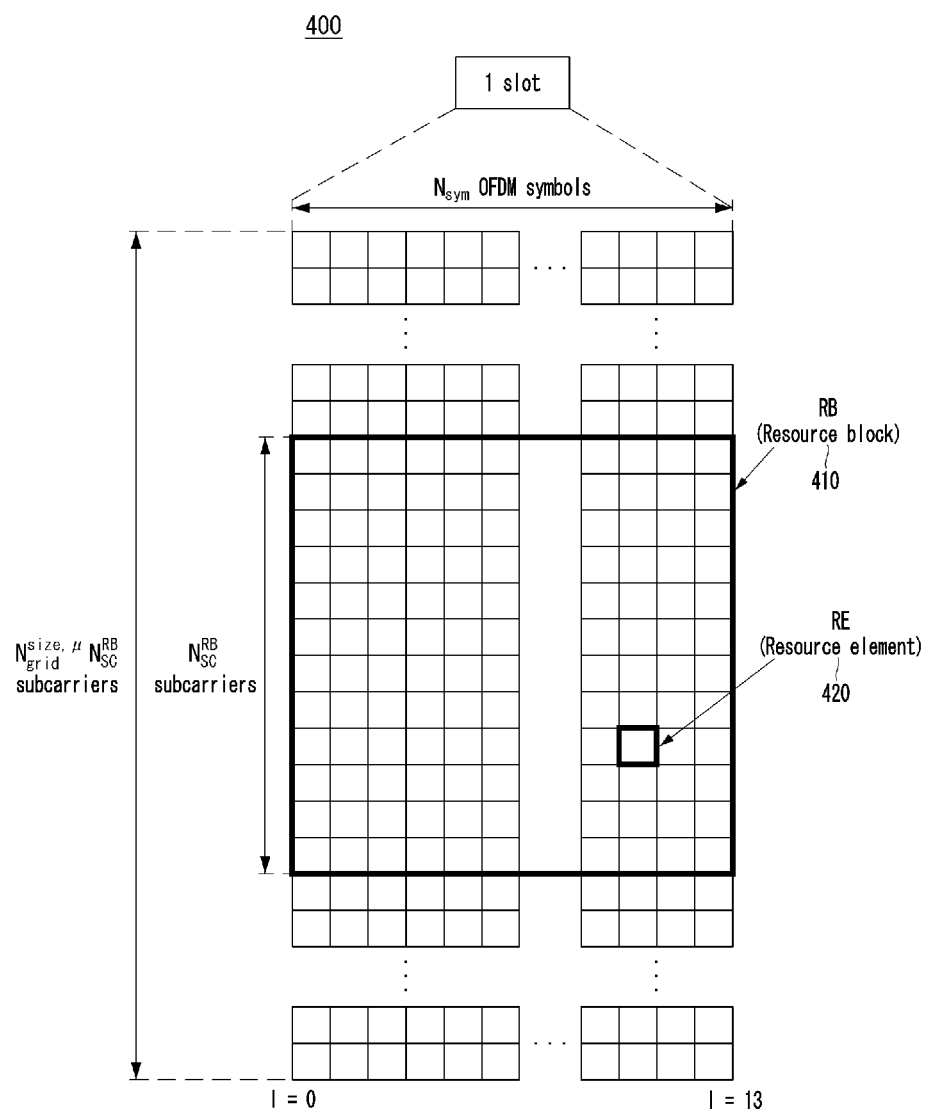
FIG. 4 is a conceptual diagram illustrating an exemplary embodiment of a time/frequency resource grid of a communication system.

FIG. 4 is a conceptual diagram illustrating an exemplary embodiment of a time/frequency resource grid of a communication system.

Referring to FIG. 4, a time/frequency resource grid 400 of a communication system may have $N_{grid}^{size,\mu} N_{sc}^{RB}$ subcarriers and $N_{slot}^{subframe,\mu}$ OFDMs. The resource grid may be defined for each numerology and each carrier. In this case, $N_{grid}^{start,\mu}$ may mean a position of a common resource block (CRB) indicated by higher layer signaling. $N_{grid}^{size,\mu}$ may mean the number of resource blocks (RBs) starting from the CRB, that is, a carrier bandwidth. $N_{grid}^{start,\mu}$ and/or $N_{grid}^{size,\mu}$ may have different values for each link direction (e.g., uplink, downlink, or sidelink) or for each numerology μ. Here, the numerology μ may be referred to by other terms, such as a SCS configuration, if necessary.

Each element in the resource grid for an antenna port p and a SCS configuration 11 may be referred to as a resource element (RE) 420, and may be uniquely defined for each position $(k,l)_{p,\mu}$. In this case, k may be a frequency axis index, and l may indicate a symbol position on the time axis. $RE(k,l)_{p,\mu}$ may correspond to a physical resource used to transmit a physical channel or a signal complex value $a_{k,l}^{(p,\mu)}$. One RB 410 may be defined as consecutive $N_{sc}^{RB}=12$ subcarriers on the frequency axis.

The 5G NR communication system has introduced the concept of BWPs in order to reduce high implementation complexity and power consumption of terminals due to the widened carrier bandwidth compared to the 3G/4G communication system. One BWP may be composed of contiguous CRBs, a starting RB position $N_{BWP,i}^{start,\mu}$ of the BWP and the number $N_{BWP,i}^{size,\mu}$ of RBs constituting the BWP may satisfy Equations 2 and 3.

$$N_{grid,x}^{start,\mu} \leq N_{BWP,i}^{start,\mu} < N_{grid,x}^{start,\mu} + N_{grid,x}^{size,\mu} \quad \text{[Equation 2]}$$

$$N_{grid,x}^{start,\mu} < N_{BWP,i}^{start,\mu} + N_{BWP,i}^{size,\mu} \leq N_{grid,x}^{start,\mu} + N_{grid,x}^{size,\mu} \quad \text{[Equation 3]}$$

The terminal may be configured with up to four downlink BWPs within one component carrier (CC), and only one downlink BWP may be activated at a time. The terminal may not receive a physical downlink shared channel (PDSCH), a physical downlink control channel (PDCCH), a channel state information reference signal (CSI-RS), or the like outside the activated BWP.

The terminal may be configured with up to four uplink BWPs within one CC, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
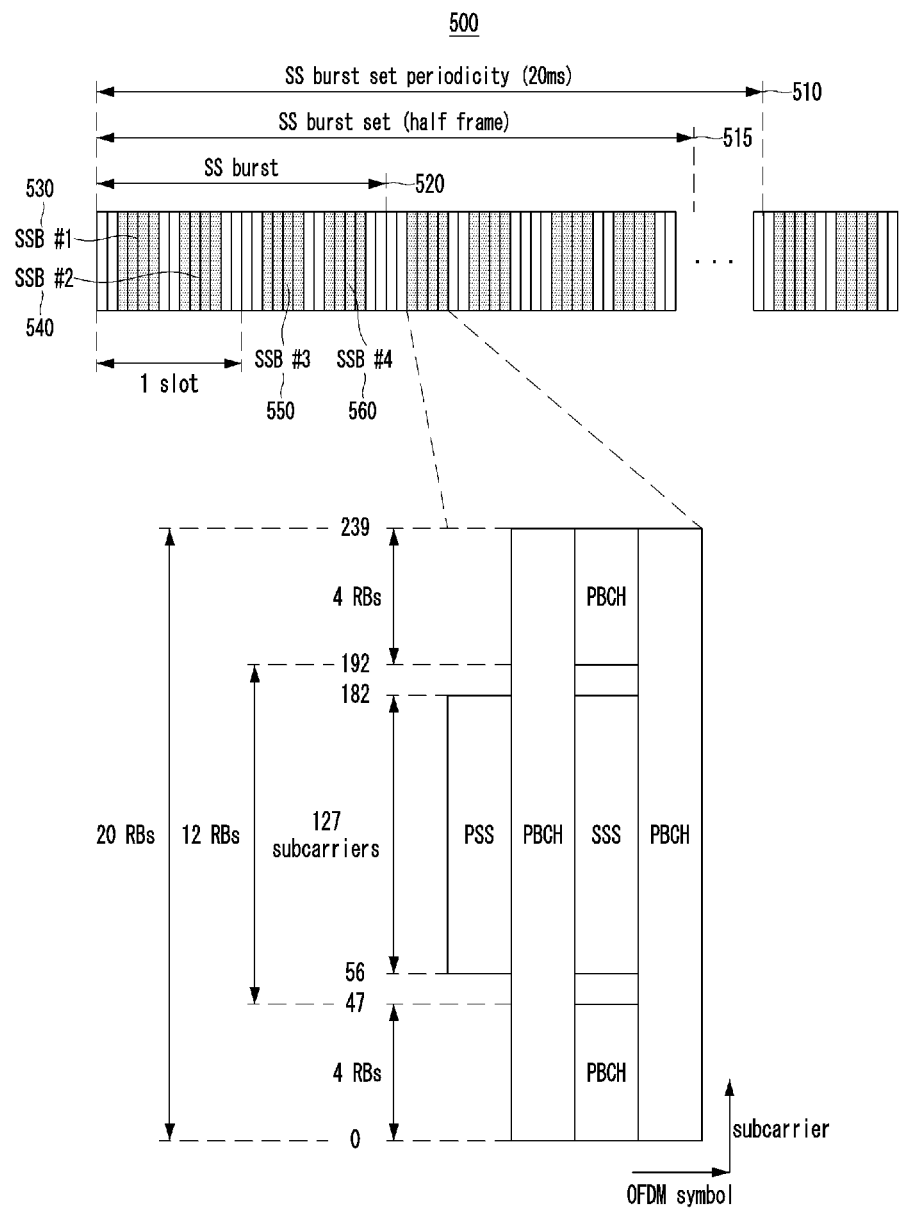
FIG. 5 is a conceptual diagram illustrating an exemplary embodiment of a synchronization signal and physical broadcast channel (SS/PBCH) block or synchronization signal block (SSB) of a communication system.

FIG. 5 is a conceptual diagram illustrating an exemplary embodiment of a synchronization signal and physical broadcast channel (SS/PBCH) block or synchronization signal block (SSB) of a communication system.

Referring to FIG. 5, an SS/PBCH block 500 of a communication system may be configured with a primary synchronization signal (PSS) transmitted in 127 subcarriers in the middle of a first OFDM symbol, a secondary synchronization signal (SSS) transmitted in 127 subcarriers in the middle of a third OFDM symbol, and a physical broadcast channel (PBCH) transmitted in second, third, and fourth OFDM symbols. The PBCH occupying the widest bandwidth may be transmitted over 20 RBs, which may be 3.6 MHz based on 15 kHz SCS. The base station transmits one SSB by applying the same beam. When the number of base station antennas increases or it is necessary to operate multiple beams such as applying one or more analog beams for high frequency support, the base station may support a multi-beam operation by transmitting multiple SSBs. Here, the term 'beam' may be expressed in various terms such as a transmission precoding or a spatial transmission (TX) filter when applied in practice. However, in order not to obscure the gist of the description, 'beam' is used hereinafter as a unified term.

For example, the base station may transmit a plurality of SSBs 530, 540, 550, and 560 to represent a plurality of beams (e.g., beam #1, beam #2, beam #3, beam #4). In this case, it may be possible that one or more SSBs are transmitted within one slot according to a pattern predetermined according to each numerology. The SSBs 530, 540, 550, and 560 to which different beams are applied may be bundled into one set by being included in an SS burst 520. The terminal may assume a half-frame window having a length of 5 ms at the time of monitoring SSBs. An SS burst set 515 configured by higher layer signaling within a half-frame may include one or more SS bursts 520. If RRC configuration values are unknown or unavailable when performing initial access (IA), the terminal may receive or measure the SSBs assuming that a periodicity of the SS burst set 510 is 20 ms. As an example, the terminal may receive SSB(s) with reference to SSB configuration information identical or similar to the following.

```
MIB ::=                          SEQUENCE 1
   systemFrameNumber
   subCarrierSpacingCommon
   ssb-SubcarrierOffset          // SSB subcarrier offset (0~15)
   dmrs-TypeA-Position
   pdcch-ConfigSIB1
   cellBarred
   intraFreqReselection
   spare
}
MeasObjectNR ::=                 SEQUENCE {
   ssbFrequency                  //Absolute Radio Frequency Channel Number (ARFCN) of
SSB
   ssbSubcarrierSpacing          // Numerology of SSB
   smtc1
                 //first SSB measurement timing configuration (SMTC) configured with reference to
   smtc2         // Second SMTC configured with reference to SSB-MTC
   . . .
   . . .
}
SSB-Index                        // SSB index within SS-burst
SSB-MTC ::=                      SEQUENCE {
   // timing occasion configuration for SSBs to be measured by terminal
   periodicityAndOffset          CHOICE {
     sf5    // offset when a SSB reception window has a legnth of 5 subframes
     sf10   // offset when a SSB reception window has a legnth of 10 subframes
     sf20   // offset when a SSB reception window has a legnth of 20 subframes
     sf40   // offset when a SSB reception window has a legnth of 40 subframes
     sf80   // offset when a SSB reception window has a legnth of 80 subframes
     sf160  // offset when a SSB reception window has a legnth of 160 subframes
   },
   duration                      // a lengh of a SSB recepion window (number of subframes)
}
SSB-MTC2 ::=                     SEQUENCE {
   pci-List                      // physical cell IDs (PCIs) following the SMTC configuration
   periodicity                   // SMTC periodicity (number of subframes)
}
```

Figure 6:
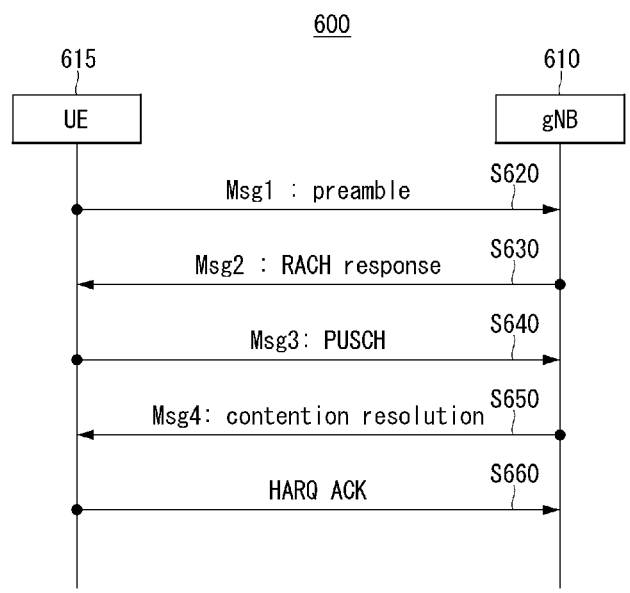
FIG. 6 is a sequence chart illustrating an exemplary embodiment of a random access procedure in a communication system.

FIG. 6 is a sequence chart illustrating an exemplary embodiment of a random access procedure in a communication system.

Referring to FIG. 6, in a random access procedure of a communication system 600, a terminal 615 may transmit a physical random access channel (PRACH) preamble based on a random access-radio network temporary identifier (RA-RNTI), and the PRACH preamble may be referred to as 'Msg1' (S620).

In this case, the RA-RNTI may be calculated by Equation 4.

$$RA - RNTI = 1 + s\_id + 14 \times t\_id + \\ 14 \times 80 \times f\_id + 14 \times 80 \times 8 \times ul\_carrier\_id$$  [Equation 4]

In Equation 4, s_id may be an index of a first OFDM symbol of a corresponding PRACH occasion (e.g., 0≤s_id<14), t_id may be an index of a first slot of the PRACH occasion within a system frame (e.g., 0≤t_id<80), f_id may be an index of the PRACH occasion in the time domain (e.g., 0≤f_id<8), and ul_carrier_id may be a value according to a uplink carrier type used for the preamble transmission (e.g., 0 indicates a regular uplink carrier, 1 indicates a supplementary uplink carrier).

Before the terminal transmits the PRACH preamble, the terminal may have at least part of the following information by receiving system information from the base station on a PBCH or receiving RRC signaling from the base station.
- PRACH preamble format
- Time/frequency resource information for RACH transmission
- Index for a logical root sequence table
- Cyclic shift $N_{CS}$
- Set type (unrestricted, restricted set A, restricted set B)

Referring again to FIG. 6, as a second procedure, the base station may provide a random access response (RAR) to the terminal, which may be referred to as 'Msg2' (S630). Particularly, the base station may calculate an RA-RNTI based on Equation 4 when the base station receives the PRACH preamble from the terminal in the step S620, and may transmit a DCI by using the RA-RNTI for scrambling. The terminal may monitor a PDCCH scrambled with the RA-RNTI in a period included in a RACH response window configured by the higher layer in a type 1 PDCCH common search space (CSS). If the terminal successfully decodes the PDCCH (or the DCI), the terminal may decode a PDSCH including RAR data. If the terminal succeeds in decoding the RAR, the terminal may identify whether an RA preamble identifier (RAPID) in the RAR matches a RAPID pre-allocated to the terminal.

As a third procedure, the terminal may transmit a PUSCH to the base station, which may be referred to as 'Msg3' (S640). To this end, the terminal may determine whether to apply a transform precoding to transmission of the PUSCH (i.e., whether to apply discrete Fourier transform (DFT)-s-OFDM-based transmission or OFDM-based transmission) based on a higher layer parameter (e.g., msg3-transform-Precoding). Also, the terminal may determine a SCS to be used for transmission of the PUSCH according to a higher layer parameter (e.g., msg3-scs). In this case, the PUSCH of Msg3 may be transmitted through a serving cell to which the PRACH has been transmitted.

As a fourth procedure, the base station may transmit a contention resolution message to the terminal, which may be referred to as 'Msg4' (S650). The terminal may start a timer for receiving the contention resolution message, and may monitor a PDCCH scrambled with a temporary cell-RNTI (TC-RNTI) in the type 1 PDCCH CSS until the timer expires. If the terminal successfully decodes the PDCCH, the terminal may decode a corresponding PDSCH including a MAC CE, and set the TC-RNTI as a cell-RNTI (C-RNTI). After successfully decoding the Msg4, the terminal may report a hybrid automatic repeat request (HARP) positive-acknowledgement (ACK) thereto to the base station, and may report whether the RACH procedure is successful to the base station (S660).

The RACH occasion (RO) may mean a time and frequency resource specified for reception of a RACH preamble, and the terminal may use the RO for PRACH transmission. As described above, in the 5G NR, multiple SSBs may be associated with different beams for the multi-beam operation, and the terminal may measure the multiple SSBs, and select an optimal SSB (i.e., optimal beam) based on one of various schemes such as a reference signal received power (RSRP), reference signal received quality (RSRQ), signal-to-noise ratio (SNR), signal-to-noise/interference ratio (SNIR), or the like. Thereafter, the terminal may determine a beam (i.e., TX spatial filter) to be used for PRACH transmission based on the beam (i.e., RX spatial filter) used when receiving the optimal SSB. In this case, a relationship between SSB(s) and RO(s) may be established for the purpose of allowing the base station or the network to know which SSB (i.e., beam) the terminal has selected. Through such the relationship, the base station may know the SSB (i.e., beam) selected by the terminal based on the RO in which the terminal has transmitted the PRACH. For example, the relationship between SSB(s) and RO(s) may be determined with reference to the higher layer configurations identical or similar to the following.

```
RACH-ConfigCommon ::=                    SEQUENCE 1
  rach-ConfigGeneric                     // set of RACH parameters
  totalNumberOfRA-Preambles              // the total number of RACH preambles (1~63)
  ssb-perRACH-OccasionAndCB-PreamblesPerSSB     CHOICE {
    oneEighth    // The number of preambles per SSB when one SSB is associated with eight
ROs
    oneFourth   // The number of preambles per SSB when one SSB is associated with four
ROs
    oneHalf     // The number of preambles per SSB when one SSB is associated with two
ROs
    one         // The number of preambles per SSB when one SSB is associated with one
RO
    two         // The number of preambles per SSB when two SSBs are associated with one
RO
    four        // The number of preambles per SSB when four SSBs are associated with
one RO
    eight       // The number of preambles per SSB when eigth SSBs are associated with
one RO
    sixteen     // The number of preambles per SSB when sixteen SSBs are associated with
one RO
  }
  groupBconfigured                       SEQUENCE 1
    ra-Msg3SizeGroupA   // The size of a transport block fro contention-based RA of Group
A
    messagePowerOffsetGroupB   // Threshold for preamble selection
    numberOfRA-PreamblesGroupA   // The number of CB preambles per SSB of Group A
  }
```

```
    ra-ContentionResolutionTimer   //Initial value of a contention resolution timer
    rsrp-ThresholdSSB         // Threshold for selection of an SSB and an associated
RACH
resource
    rsrp-ThresholdSSB-SUL    // Threshold for selection of an SSB and an associated RACH
resource in SUL
      prach-RootSequenceIndex         CHOICE { // RACH root sequence index
        1839
        1139
    },
    msg1-SubcarrierSpacing      // SCS for Msg1 transmission
    restrictedSetConfig         // one of {unrestricted, restricted set A, restricted set B}
    msg3-transformPrecoder      // whether to apply transform precoding in transmisison of
Msg3
    . . .
}
RACH-ConfigGeneric::=                     SEQUENCE {
    prach-ConfigurationIndex    // indicates a preamble format, etc.
    msg1-FDM                    // The number of ROs FDMed at a time
    msg1-Frequency Start        // frequnecy-axis offset of the lowest RO with reference to
PRB
0
    zeroCorrelationZoneConfig    // N-CS configuration
    preambleReceivedTargetPower //Target power level at a network receiving node
    preambleTransMax
      // The maximum number of RA preambe transmissions performed unitl declaration of an
RA failure
    powerRampingStep            // Power ramping step
    ra-ResponseWindow           // Msg2 (RAR) window length (number of slots)
    . . .,
},
```

Figure 7:
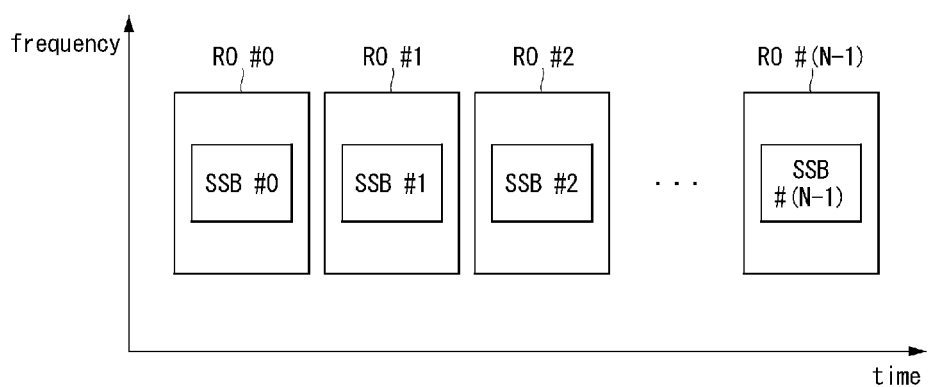
FIG. 7 is a conceptual diagram illustrating a first exemplary embodiment of SSB-RO association according to RACH configuration in a communication system.

FIG. 7 is a conceptual diagram illustrating a first exemplary embodiment of SSB-RO association according to RACH configuration in a communication system.

Referring to FIG. 7, in the SSB-RO association according to the RACH configuration, N SSBs 710-1 to 710-n having the same frequency band and different in time may be associated with ROs 720-1 to 720-n having the same frequency band and different in time on a one-to-one basis. In this case, a frequency division higher layer parameter (e.g., msg1-FDM) may be set to 1 (e.g. msg1-FDM=one), and a time division higher layer parameter (e.g., ssb-perRACH-OccasionAndCB-PreamblesPerSSB) may be set to 1 (e.g., ssb-perRACH-OccasionAndCB-PreamblesPerSSB=one). As described above, N different SSBs 710-1 to 710-n may be associated with N different ROs 720-1 to 720-n by occupying one bandwidth.

Figure 8:
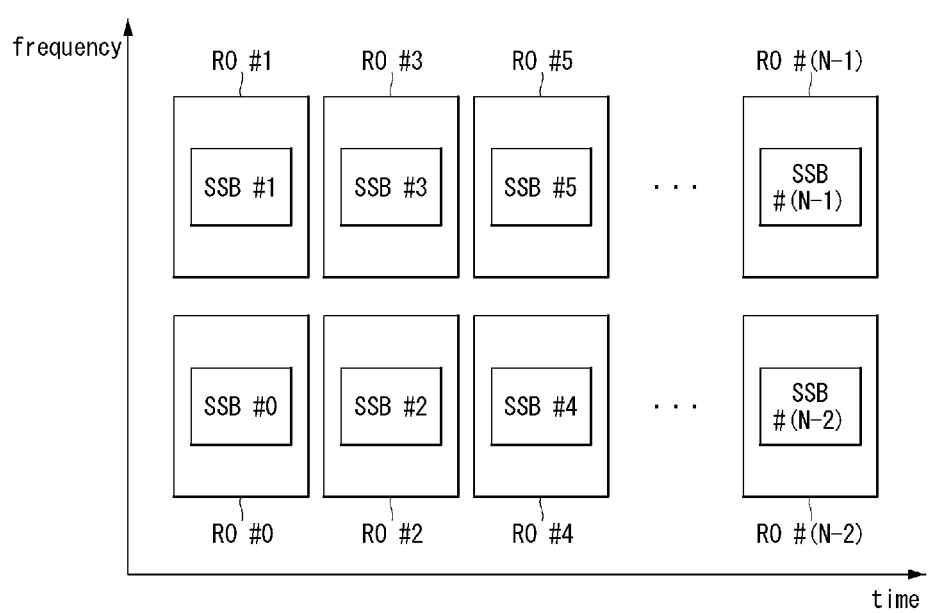
FIG. 8 is a conceptual diagram illustrating a second exemplary embodiment of SSB-RO association according to RACH configuration in a communication system.

FIG. 8 is a conceptual diagram illustrating a second exemplary embodiment of SSB-RO association according to RACH configuration in a communication system.

Referring to FIG. 8, in the SSB-RO association according to the RACH configuration, SSBs 810-1, 810-3, 810-5, . . . , and 810-(n−1) different in time in a first frequency band may be associated with ROs 820-1, 820-3, 820-5, . . . , and 820-(n−1) different in time in the first frequency band on a one-to-one basis, and SSBs 810-2, 810-4, 810-6, . . . , and 810-n different in time in a second frequency band may be associated with ROs 820-2, 820-4, 820-6, . . . , and 820-n different in time in the second frequency band on a one-to-one basis. In this case, the frequency division higher layer parameter (e.g., msg1-FDM) may be set to 2 (e.g., msg1-FDM=two), and the time division higher layer parameter (e.g., ssb-perRACH-OccasionAndCB-PreamblesPerSSB) may be set to 2 (e.g., ssb-perRACH-OccasionAndCB-PreamblesPerSSB=two). As described above, the N different SSBs 810-1 to 810-n may be associated with N different ROs 820-1 to 820-n by occupying two bandwidths.

Meanwhile, the 5G NR communication system may support DCI formats shown in Table 4 based on Release-16.

TABLE 4

| DCI format | Usage |
| --- | --- |
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |
| 1_1 | Used for scheduling a PDSCH within one cell or triggering a one-shot HARQ-ACK codebook feedback |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

DCI may include downlink control information for one or more cells, and may be associated with one RNTI. The DCI may be encoded through the order of 1) information element multiplexing, 2) cyclic redundancy check (CRC) addition, 3) channel coding, and 4) rate matching, and decoding may also be performed in consideration of the above steps. In the above description, "a certain DCI is associated with one RNTI" may mean that CRC parity bits of the DCI are scrambled with the RNTI. Referring to Table 4, some DCI may include scheduling information of one or more PUSCHs for a certain cell.

For example, a CRC of the DCI format 0_1 may be scrambled with a C-RNTI, configured scheduling-RNTI (CS-RNTI), semi-persistent CSI RNTI (SP-CSI-RNTI), or modulation coding scheme cell RNTI (MCS-C-RNTI). The DCI format 0_1 may include at least one of the following information.

- Identifier for DCI format (1 bit): Indicator indicating a UL DCI format, which is always set to 0 in the case of DCI format 0_1
- Carrier indicator (0 or 3 bits): Indicator indicating a CC scheduled by the corresponding DCI
- DFI flag (0 or 1 bit): Configured grant downlink feedback information (CG-DFI) indicator.
- If the DCI format 0_1 is used for CG-DFI indication (when the DFI flag is set to 1), at least one of the following fields may be used:
- HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.
- TPC command for a scheduled PUSCH (2 bits)
- All the remaining bits in the DCI format 0_1 are set to zero
- If the DCI format 0_1 is not used for CG-DFI indication (when there is no DFI flag field or DFI flag field is set to 0), at least one of the following fields may be used:
- UL/SUL indicator (0 or 1 bit): supplementary UL indicator.
- Bandwidth part indicator (0, 1, or 2 bits): Indicator indicating a BWP to be activated among uplink BWPs configured for the terminal.
- Frequency domain resource assignment: Indicator for allocating a frequency domain resource.
- Time domain resource assignment: Indicator for allocating a time domain resource.
- Frequency hopping flag (0 or 1 bit): Frequency axis hopping indicator
- Modulation and coding scheme (5 bits)
- New data indicator (NDI): Indicator indicating whether allocated data is new data or retransmission data.
- Redundancy version (RV): Indicator indicating an RV value when channel coding is applied to allocated data
- HARQ process number (4 bits): Indicator indicating a HARQ process to be allocated to scheduled data
- TPC command for a scheduled PUSCH (2 bits): TPC indicator
- SRS resource indicator: Aperiodic SRS resource selection indicator
- Precoding information and number of layers: Indicator indicating precoding and the number of transport layers to be used in PUSCH transmission
- Antenna ports: Indicator for uplink antenna ports to be used for PUSCH transmission
- SRS request: Indicator indicating whether to transmit aperiodic SRS
- CSI request: Indicator indicating whether and how to report channel state information
- PTRS-DMRS association: Indicator indicating a relationship between an uplink phase-noise tracking reference signal (PTRS) antenna port and a demodulation reference signal (DMRS) antenna port
- DMRS sequence initialization: Indicator for a DMRS sequence initialization value during OFDM-based uplink transmission
- UL-SCH indicator: Indicator indicating whether or not an uplink shared channel (UL-SCH) is included in a PUSCH (a PUSCH that does not include a UL-SCH needs to include CSI)
- Open-loop power control parameter set indication: Indicator indicating a set of open-loop power control (OPLC) parameter set
- Priority indicator: Uplink transmission priority indicator.
- Invalid symbol pattern indicator: Indicator indicating whether to apply an invalid symbol pattern configured by a higher layer As another example, a CRC of the DCI format 1_1 may be scrambled with a C-RNTI, CS-RNTI, or MCS-C-RNTI, and the DCI format 1_1 may include at least one of the following information.

- Identifier for DCI format (1 bit): Indicator indicating a DL DCI format, which is always set to 1 in the case of DCI format 1_1
- Carrier indicator (0 or 3 bits): Indicator indicating a CC scheduled by the corresponding DCI
- Bandwidth part indicator (0, 1, or 2 bits): Indicator indicating a BWP to be activated among downlink BWPs configured for the terminal
- Frequency domain resource assignment: Indicator for allocating a frequency domain resource
- Time domain resource assignment: Indicator for allocating a time domain resource
- PRB bundling size indicator: Indicator indicating a type (i.e., static or dynamic) and a size of PRB bundling
- Rate matching indicator: Indicator indicating a rate matching pattern configured by a higher layer
- ZP CSI-RS trigger: Indicator for applying aperiodic zero-power (ZP) CSI-RS
- 'modulation and coding scheme', 'new data indicator', and 'redundancy version' fields for a transport block 1
- 'modulation and coding scheme', 'new data indicator', and 'redundancy version' fields for a transport block 2
- HARQ process number: Indicator indicating a HARQ process to be allocated to scheduled data
- Downlink assignment index: DAI indicator for HARQ-ACK codebook generation in TDD operation
- TPC command for a scheduled PUCCH: Power control indicator for PUCCH transmission
- PUCCH resource indicator: Indicator indicating a PUCCH resource for transmitting HARQ-ACK information for an allocated PDSCH or a predetermined PDSCH set
- PDSCH-to-HARQ feedback timing indicator: Indicator indicating a time axis offset between the allocated PDSCH and the PUCCH
- Antenna port(s): Indicator indicating antenna ports to be used for PDSCH transmission/reception
- Transmission configuration indication: Indicator indicating transmission configuration information (TCI) to be used for PDSCH transmission and reception
- SRS request: Indicator indicating whether to transmit aperiodic SRS
- DMRS sequence initialization: Indicator for a DMRS sequence initialization value used for PDSCH transmission and reception
- Priority indicator: PDSCH reception priority indicator As another example, certain DCI formats may be used to deliver the same control information to one or more terminals. For example, a CRC of the DCI format 2_3 may be scrambled with a transmit power control-sounding reference signal-RNTI (TPC-SRS-RNTI), and may include at least one of the following information.

Block number 1, Block number 2, . . . , Block number B: Indicators indicating resource regions to which the DCI format 2_3 is applied. A starting part of the block is configured by a higher layer parameter startingBitOfFormat2-3 or startingBitOfFormat2-3SUL-v1530.

When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, . . . , TPC command number N: Indicators indicating uplink power control to be applied to a UL carrier indicated by a higher layer parameter cc-IndexInOneCC-Set When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

As another example, certain DCI formats may be used to deliver the same control information to one or more terminals. For example, a CRC of the DCI format 2_0 may be scrambled with an SFI-RNTI, and may be used for notifying information such as a slot format, a channel occupancy time (COT) duration, an available RB set, a search space set group switching, or the like. Specifically, the DCI format 2_0 may include at least one of the following information.

When a higher layer parameter slotFormatCombToAddModList is configured,
      Slot format indicator 1, Slot format indicator 2, . . . , Slot format indicator N
   When a higher layer parameter availableRB-SetsToAddModList-r16 is configured,
      Available RB set indicator 1, Available RB set indicator 2, . . . , Available RB set indicator N1
   When a higher layer parameter co-DurationsPerCellToAddModList-r16 is configured,
      COT duration indicator 1, COT duration indicator 2, . . . , COT duration indicator N2
   When a higher layer parameter searchSpaceSwitchTriggerToAdolModList-r16 is configured,
      Search space set group switching flag 1, Search space set group switching flag 2, . . . , Search space set group switching flag M The size of the DCI format 2_0 may be set by higher layer signaling as one of 0 to 128 bits. For example, the DCI format 2_5 may be used to notify availability of soft-type resources of an IAB node. A CRC of the DCI format 2_5 may be scrambled with an availability indicator-RNTI (AI-RNTI), and may include the following information.

Availability indicator 1, Availability indicator 2, . . . , and Availability indicator N As the size of DCI format 2_5, one of values less than or equal to 128 bits may be set by higher layer signaling. The terminal may receive configuration information of a CORESET #0 and a search space #0, identical or similar to that shown in the following.

```
PDCCH-ConfigSIB 1 ::=           SEQUENCE 1
  controlResourceSetZero
  searchSpaceZero
}
ControlResourceSetZero    // indicates a configuration value (0~15) of a CORESET #0 within
an
initial BWP
SearchSpaceZero           // indicates a configuration value (0~15) of a search space #0 within
an
initial BWP
```

The terminal may refer to the following higher layer configurations for cell-specific PDCCH monitoring, identical or similar to those shown in the following.

```
PDCCH-ConfigCommon ::=        SEQUENCE {
  controlResourceSetZero // indicates a configuration value (0~15) of a CORESET #0 within an
  initial BWP
  commonControlResourceSet
    // configure a common CORESET by referring to CORESET configuration
  searchSpaceZero   // indicates a configuration value (0~15) of a search space #0 within an initial
  BWP
  commonSearchSpaceList  // configures a search sapce to be used for cell-specific PDCCH
  monitoring by referring to up to four search space configurations
  searchSpace SIB1        // search space configuration for SIB1
  searchSpaceOtherSystemInformation    // search space configuration for SIB2 or other SIBs
  pagingSearchSpace              // search space configuration for paging
  ra-SearchSpace                 // search space configuration for random access proce-
  dure
  . . .
}
```

-continued

```
ControlResourceSet ::=            SEQUENCE {
controlResourceSetId              // CORESET ID (a value other than 0 is used)
frequencyDomainResources          // configuration of frequency resources of a CORESET
duration                          // configuration of a time-axis length (symbols) of a CORESET
cce-REG-MappingType               CHOICE { // CCE-to-REG mapping configuration
  interleaved                     SEQUENCE {
    reg-BundleSize
    interleaverSize
    shiftIndex
  },
  nonInterleaved
},
precoderGranularity
tci-StatesPDCCH-ToAddList
    // indicates a QCL relation possible between a QCL reference RS and a PDCCH
DMRS
tci-StatesPDCCH-ToReleaseList
tci-PresentInDCI       // indicates whether a TCI field exists within the DCI format 1_1
pdcch-DMRS-ScramblingID   // indicates a scrambling initialization value of a PDCCH DMRS
 . . .
}
SearchSpace ::=                 SEQUENCE {
  searchSpaceId                 // search space ID
  controlResourceSetId          // CORESET ID associated with the search space
monitoringSlotPeriodicityAndOffset    CHOICE { // periodicity and offset of a PDCCH
monitoring slot
    sl1       // performs PDCCH monitoring in every slot
    . . .
              // (omitted) monitoring offset values when a PDCCH monitoring periodicity is
one of 2 to 1280 slots
    sl2560    // a monitoring offset value when a PDCCH monitoring periodicity is 2560 slots
  }
  duration    // the number of slots where a search space exists for each occasion
÷
  monitoringSymbolsWithinSlot
  // a position of a first symbol on which monitoring is to be performed within a PDCCH
monitoring slot
  nrofCandidates                SEQUENCE {
    aggregationLevel1    // The number of PDCCH candidates in case of aggregation level 1
    aggregationLevel2    // The number of PDCCH candidates in case of aggregation level 2
    aggregationLevel4    // The number of PDCCH candidates in case of aggregation level 4
    aggregationLevel8    // The number of PDCCH candidates in case of aggregation level 8
    aggregationLevel16   // The number of PDCCH candidates in case of aggregation level 16
  }
  searchSpaceType         CHOICE { // indicates a search space type
(common or UE-specific) and DCI formats
    common                      SEQUENCE {
      dci-Format0-0-AndFormat1-0    SEQUENCE {
        . . .
      }
      dci-Format2-0               SEQUENCE {
        nrofCandidates-SFI        SEQUENCE {
          . . .
        },
        . . .
      }
      dci-Format2-1
      dci-Format2-2
      dci-Format2-3               SEQUENCE {
        dummy1
        dummy2
      }
    },
    ue-Specific                 SEQUENCE {
      dci-Formats
      . . .,
    }
  }
}
```

The terminal may refer to the following higher layer configurations for UE-specific PDCCH monitoring, identical or similar to those shown in the following.

```
PDCCH-Config ::=           SEQUENCE {
  controlResourceSetToAddModList
       // At most three CORESETs are configured by referring to CORESET configuration
  controlResourceSetToReleaseList
  searchSpacesToAddModList
       // At most ten search spaces are configured by referring to search space configuration
  searchSpacesToReleaseList
  downlinkPreemption    // downlink preemption indicator
  tpc-PUSCH             // configuraion of reception of a group TPC for PUSCH transmis-
sion
  tpc-PUCCH             // configuration of reception of a group TPC for PUCCH transmis-
sion
  tpc-SRS               // configuration of reception of a group TPC for SRS transmission
  ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, information (i.e., QCL information) on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread}.
QCL-Type B: including {Doppler shift, Doppler spread}
QCL-Type C: including {Doppler shift, average delay}
QCL-Type D: including {Spatial Rx parameters}

Figure 9:
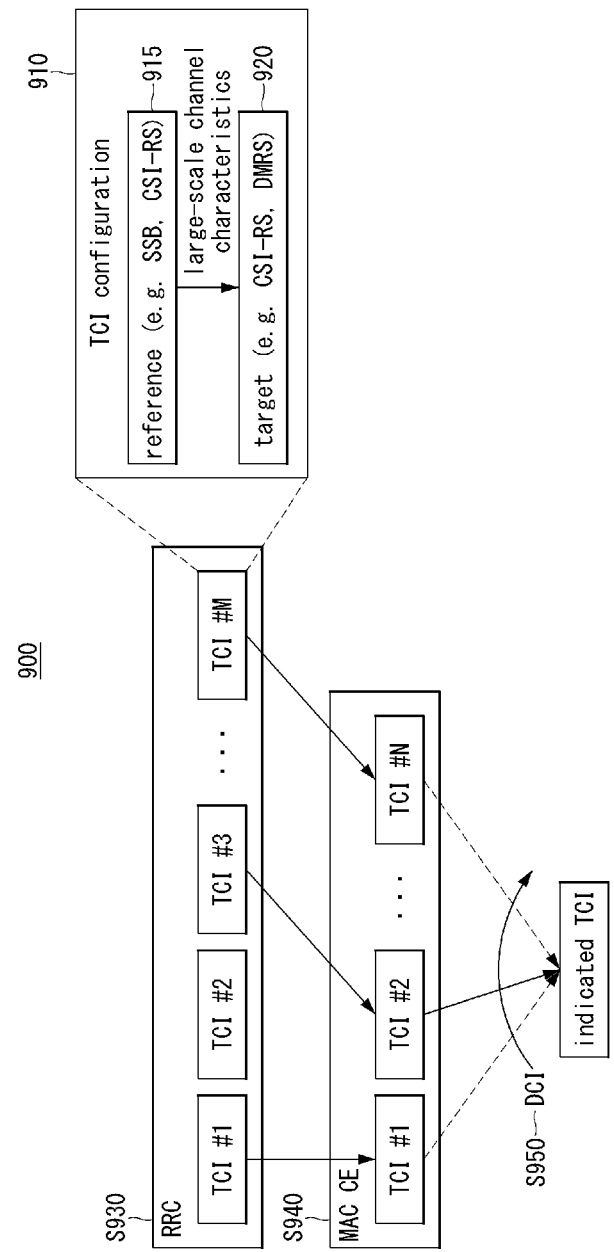
FIG. 9 is a conceptual diagram illustrating an exemplary embodiment of a QCL information transfer process through TCI state configuration and indication in a communication system.

FIG. 9 is a conceptual diagram illustrating an exemplary embodiment of a QCL information transfer process through TCI state configuration and indication in a communication system.

Referring to FIG. 9, in a process of transmitting QCL information through TCI state configuration and indication in a communication system 900, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration 910 may include information on a signal or channel (i.e., QCL reference 915) that provides large-scale channel characteristics to a signal or channel (i.e., QCL target 920) referring to the TCI. One TCI state configuration 910 may include up to two references (i.e., qcl-Type1 and qcl-Type2), the first reference may be one of the QCL-Type A, QCL-Type B, and QCL-type C (i.e., qcl-type1∈{QCL-type A, QCL-type B, QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal, the base station may transmit an activation message for some of the TCIs configured through the RRC signaling to the terminal through L2 signaling such as a MAC CE (S940). The base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI (S950). The terminal may apply QCL information indicated by the corresponding TCI at a predetermined timing after receiving the L1 signaling, and may perform a reception operation for the signal or channel.

The TCI state indication steps including the 'RRC signaling (S930)', 'MAC CE signaling (S940)', and 'DCI signaling (S950)' of FIG. 9 may be partially omitted depending on a type of the QCL target RS. For example, when the QCL target is a PDSCH DMRS, and one or more TCI states are configured through RRC signaling, the base station may indicate the TCI state using all the steps of FIG. 9. However, when the QCL target is a PDSCH DMRS, and a single TCI state is configured through RRC signaling, the MAC CE signaling (S940) and the DCI signaling step (S950) may be omitted. Similarly, when the QCL target is a PDCCH DMRS, the DCI signaling step S940 may be omitted. Specifically, the terminal may obtain configuration information for the TCI states and QCL information with reference to the RRC signaling identical or similar to those shown in the following.

```
TCI-State ::=    SEQUENCE { // TCI configuration (I.1-00)
  tci-StateId    // TCI state ID
  qcl-Type1      // first QCL reference configured by referring to QCL information
  qcl-Type2      // second QCL reference configured by referring to QCL information
  ...
}
QCL-Info ::=           SEQUENCE {
  cell           // index of a cell in which QCL reference is transmitted
```

```
bwp-Id            // index of a BWP in which QCL reference is transmitted
referenceSignal           CHOICE {
   csi-rs         // index of a CSI-RS to be referred when QCL reference is a CSI-RS
   ssb            // index of an SSB to be referred when QCL reference is an SSB
},
qcl-Type
  // QCL type to be applied to a QCL target (one of QCL-type A, QCL-type B, QCL-
type C,
and QCL-type D)
...
}
```

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.

- TCI state activation/deactivation MAC CE for a UE-specific PDSCH DMRS
- TCI state indication MAC CE for a UE-specific PDCCH DMRS
- TCI state activation/deactivation MAC CE for an enhanced UE-specific PDSCH DMRS FIG. 10 is a conceptual diagram illustrating an exemplary embodiment of a TCI state activation/deactivation MAC CE in a communication system.

Referring to FIG. 10, a first octet (Oct 1) in a TCI state activation/deactivation MAC CE for a UE-specific PDSCH DMRS may include a COREST pool ID field 1010, a serving cell ID field 1020, and a BWP ID field 1030, and a second octet (Oct 2) to an N-th octet (Oct N) may include $T_i$ fields 1040 indicating TCI state IDs i. The detailed meaning of each field may be as follows, and the sizes thereof may be variable.

- Serving cell ID: a serving cell ID to which the MAC CE is applied
- BWP ID: BWP ID to which the MAC CE is applied, which indicates a BWP in association with a BWP indication field within the DCI
- $T_i$: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.
- CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, $T_i$ indication may be applied only when a value of the CORESET pool ID matches a value of coresetPoolIndex of the CORESET.

Figure 11:
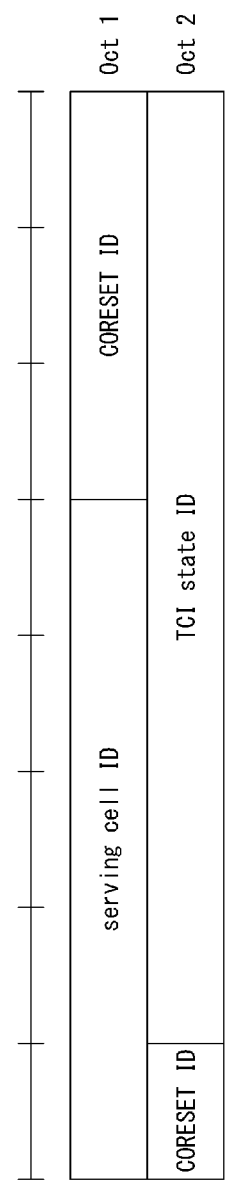
FIG. 11 is a conceptual diagram illustrating an exemplary embodiment of a TCI state indication MAC CE in a communication system.

FIG. 11 is a conceptual diagram illustrating an exemplary embodiment of a TCI state indication MAC CE in a communication system.

Referring to FIG. 11, a first octet (Oct 1) in a TCI state activation/deactivation MAC CE for a UE-specific PDSCH DMRS may include a serving cell ID field 1110 and a CORESET ID field 1120, and a second octet (Oct 2) may include a CORESET ID field 1130 and a TCI state ID field 1140. The sizes thereof may be variable.

- Serving cell ID: a serving cell ID to which the corresponding MAC CE is applied.
- CORESET ID: indicates a CORESET to which the MAC CE is applied. If this value is set to 0, a CORESET configured through controlResourceSetZero may be a CORESET #0.
- TCI state ID: means a TCI state ID indicated by the corresponding MAC CE.

The base station may configure spatial relation information to the terminal through higher layer (e.g., RRC) signaling in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, when the target RS is an SRS, the base station may perform RRC configuration for each SRS resource based on message identical or similar to those shown in the following.

```
SRS-SpatialRelationInfo ::=    SEQUENCE {
   servingCellId            //index of a serving cell in which a reference RS is transmitted
   referenceSignal                CHOICE {
      ssb-Index             // SSB index when a reference RS is SSB
      csi-RS-Index          // CSI-RS resource index when a reference RS is CSI-RS
      srs                      SEQUENCE {
         resourceId         // SRS resource index when a reference RS is SRS
         uplinkBWP          // index of a UL BWP in which SRS is transmitted when a refer-
ence
RS is SRS
      }
   }
}
```

For example, when the target RS is an SRS, the base station may perform RRC configuration for each SRS resource, identical or similar to those shown in the following.

```
PUCCH-SpatialRelationInfo ::=    SEQUENCE {
  pucch-SpatialRelationInfoId    // spatial relation information ID for PUCCH
  servingCellId                  // index of a serving cell in which a reference RS is
tmnsmitted
  referenceSignal                         CHOICE {
    ssb-Index                    // SSB index when a reference RS is SSB
    csi-RS-Index                 // CSI-RS resource index when a reference RS is CSI-
RS
    srs                          // specifiy a SRS resource by referring to PUCCH-SRS
configuration
  },
  pucch-PathlossReferenceRS-Id
        // index of a RS resource to be used for measurement of a pathloss of a
PUCCH
  p0-PUCCH-Id     // index of confuring p0 for PUCCH power control
  closedLoopIndex  // configuration value of closed-loop power control
}
PUCCH-SRS ::=   SEQUENCE {
  resource               // SRS resource index
  uplinkBWP              // index of a BWP in which SRS is transmitted
}
```

In the 5G NR communication system, a slot format may include downlink symbol(s), uplink symbol(s), and/or flexible symbol(s).

Figure 12:
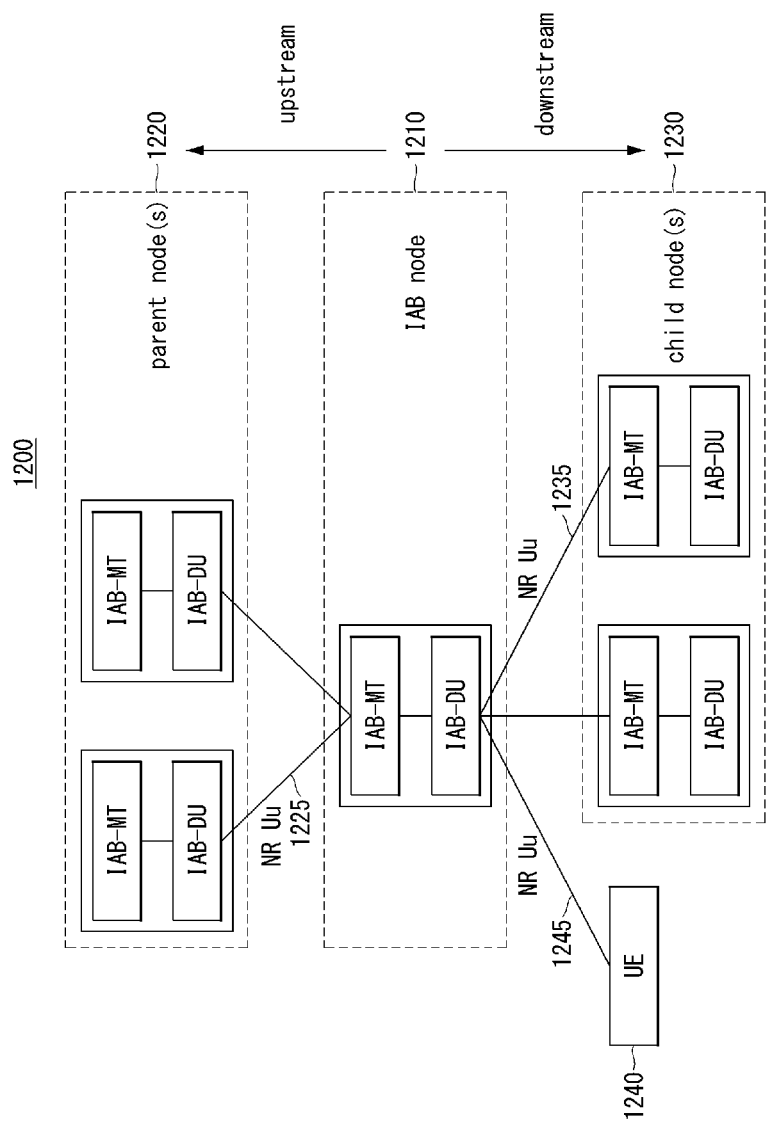
FIG. 12 is a conceptual diagram illustrating an exemplary embodiment of an IAB network in a communication system.

FIG. 12 is a conceptual diagram illustrating an exemplary embodiment of an IAB network in a communication system.

Referring to FIG. 12, a communication system 1200 may include one or more communication nodes. The communication nodes of the communication system 1200 may constitute an IAB network. For example, the communication system 1200 may include one or more IAB nodes. FIG. 12 shows an exemplary embodiment in which one IAB node communicates with one or more upper nodes and one or more lower nodes. However, this is only an example for convenience of description, and exemplary embodiments of the present disclosure are not limited thereto.

The communication system 1200 may include a plurality of IAB nodes. For example, the communication system 1200 may include a first IAB node 1210, one or more parent nodes 1220 corresponding to upper nodes of the first IAB node 1210, and/or one or more child nodes 1230 corresponding to lower nodes of the first IAB node 1210. Here, each of the one or more parent nodes 1220 may be referred to as a 'donor node'. The IAB node 1210, the one or more parent nodes 1220, and/or the one or more child nodes 1230 may constitute the IAB network. Each of the IAB nodes 1210, 1220, and 1230 constituting the IAB network may function as a type of repeater configured based on a front-haul structure. In the communication system 1200 to which the IAB network technology is applied, it is possible to support flexible and dense wireless backhaul links for each cell without support of a wired network.

Each of the IAB nodes 1210, 1220, and 1230 may include an IAB-DU and an IAB-MT. The IAB-MT may allow each IAB node to function as a terminal in communication with an upper node. For example, the first IAB node 1210 may communicate with the upper parent nodes 1220 through the IAB-MT. On the other hand, the IAB-DU may allow each IAB node to function as a base station or a cell in communication with a lower node. For example, the first IAB node 1210 may communicate with the lower child nodes 1230 or a terminal 1240 through the IAB-DU.

The IAB-MT of the first IAB node 1210 may be connected to the IAB-DUs of the parent nodes 1220 through Uu interfaces 1235. The IAB-DU of the first IAB node 1210 may be connected to the IAB-MTs of the child nodes 1230 through Uu interfaces 1235. The IAB-DU of the first IAB node 1210 may be connected to a terminal 1240 through a Uu interface 1245.

After the IAB node constituting the IAB network completely decodes a received signal, the IAB node may re-encode the decoded received signal, and amplify and transmit it. The IAB node may be classified as a type of regenerative relay. To this end, the IAB node may support a control plane (CP) and a user plane (UP) from the parent node to the terminal based on a protocol stack structure including the L1 and L2 layers, or higher layers.

The IAB node constituting the IAB network has an advantage of being able to perform various operations including operations as a base station and a terminal. On the other hand, the IAB node has disadvantages in that implementation complexity and production cost are relatively high, and a delay required for retransmission may be relatively large.

Figure 13:
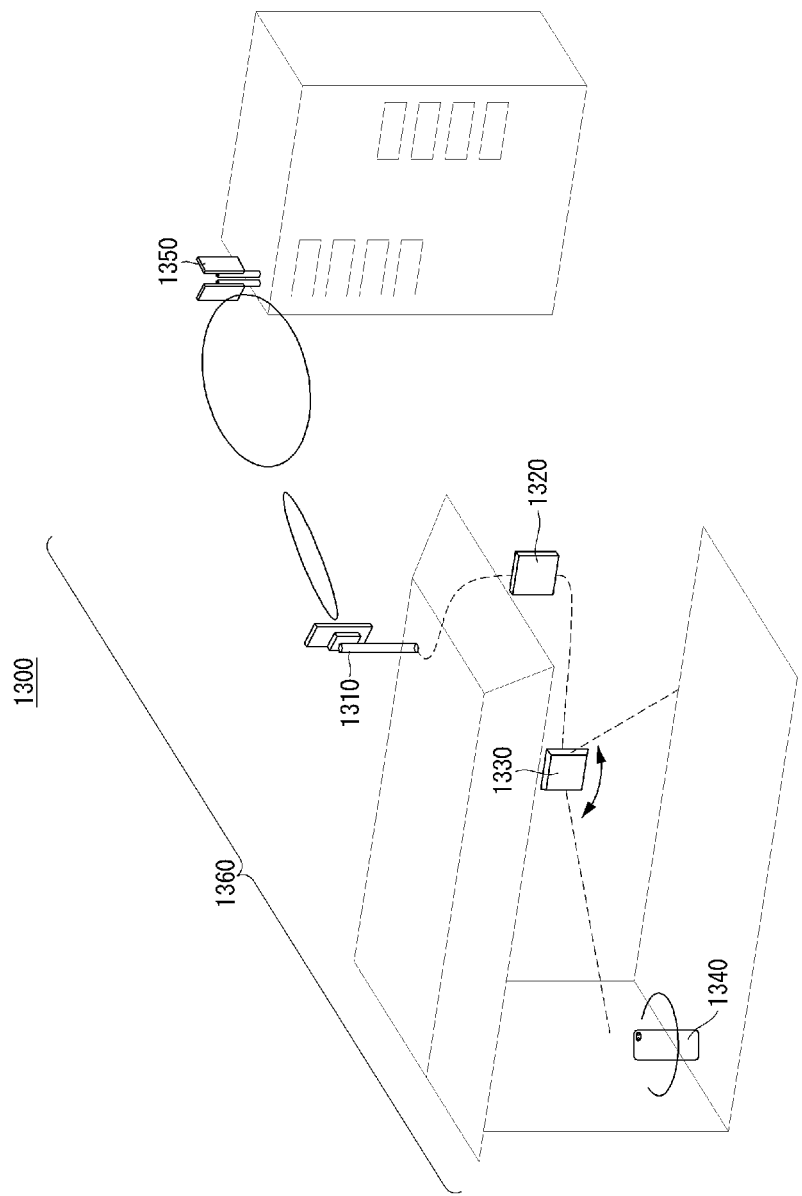
FIG. 13 is a conceptual diagram illustrating a first exemplary embodiment of a signal transmission/reception method based on a wireless repeater in a communication system.

FIG. 13 is a conceptual diagram illustrating a first exemplary embodiment of a signal transmission/reception method based on a wireless repeater in a communication system.

Referring to FIG. 13, a communication system 1300 may include one or more communication nodes. For example, the communication system 1300 may include one or more base stations and one or more terminals. The communication system 1300 may include one or more repeaters that relay communications between one or more communication nodes. FIG. 13 shows an exemplary embodiment in which one repeater relays communications between one base station existing outdoors and one terminal existing indoors. However, this is only an example for convenience of description, and exemplary embodiments of the present disclosure are not limited thereto. For example, an exemplary embodiment of the communication system 1300 may include a plurality of base stations, terminals, and/or repeaters to perform mutual communications.

In an exemplary embodiment of the communication system 1300, a repeater 1320 including an outdoor antenna 1310 may receive and relay a radio signal received in an outdoor space. When the repeater 1320 further includes an indoor antenna 1330, the repeater 1320 may relay a radio signal received from the outdoor space to an indoor space.

Alternatively, the repeater 1320 may relay a radio signal received in the indoor space to the outdoor space. The repeater 1320 may be a radio frequency (RF) repeater mainly used to cover an indoor radio shadow area. The respective elements constituting the repeater 1320 may be interconnected by wire or wirelessly.

The repeater 1320 may relay communications between a terminal 1340 located indoors and a base station 1350 located outdoors through the indoor and outdoor antennas 1310 and 1330. For example, the repeater 1320 may receive a downlink signal transmitted from the base station 1350 through the outdoor antenna 1310. The repeater 1320 may amplify the received signal and transmit it to the terminal 1340 in the indoor space through the indoor antenna 1330. On the other hand, the repeater 1320 may receive an uplink signal transmitted from the terminal 1340 through the indoor antenna 1330. The repeater 1320 may amplify the received signal and transmit it to the base station 1350 through the outdoor antenna 1310. The outdoor antenna 1310 may be referred to as a 'first antenna', and the indoor antenna 1320 may be referred to as a 'second antenna'. Hereinafter, configurations related to an operation in which the repeater 1320 relays a downlink signal will be described as an example. However, this is only an example for convenience of description, and exemplary embodiments of the present disclosure are not limited thereto. For example, exemplary embodiments of the present disclosure may be equally or similarly applied to an operation of the repeater 1320 relays an uplink signal.

Commercial RF repeaters are generally capable of operating in the FR1 band. In the FR1 band, the base station 1350 may perform communications through one beam per one cell or one sector. Here, the base station 1350 may correspond to an eNodeB (eNB) or a gNodeB (gNB). The outdoor antenna 1310 provided for communications with the base station 1350 may be a directional antenna. For example, the outdoor antenna 1310 may be a directional log-periodic dipole array (LPDA) type antenna. The outdoor antenna 1310 may be installed to face the direction of the base station. The indoor antenna 1330 provided for communications with the terminal 1340 may be a patch antenna. For example, the indoor antenna 1330 may be configured as a patch antenna having an effective coverage of about 70 degrees to 75 degrees. The indoor antenna 1330 may support communications with the terminal 1340 operating in an omni-directional beam scheme or an omni-beam scheme.

The base station 1350 may recognize all beams on a communication path from the base station 1350 to the terminal 1340 through the repeater 1320 as one 'single virtual TX beam'. On the other hand, the base station 1350 may recognize all beams on a communication path from the terminal 1340 to the base station 1350 through the repeater 1320 as one 'single virtual RX Beam'.

Figure 14:
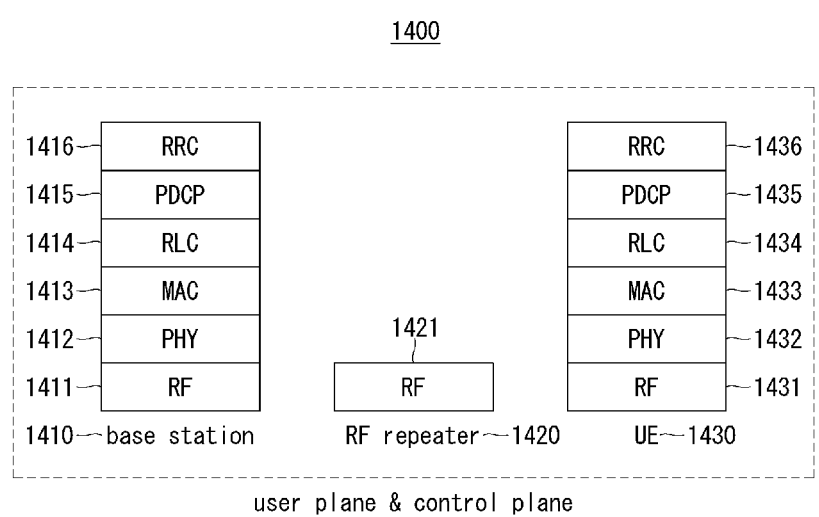
FIG. 14 is a conceptual diagram illustrating a first exemplary embodiment of a user plane and a control plane in a communication system including a wireless repeater.

FIG. 14 is a conceptual diagram illustrating a first exemplary embodiment of a user plane and a control plane in a communication system including a wireless repeater.

Referring to FIG. 14, in a radio connection section between communication nodes, a radio interface protocol or a radio interface protocol stack structure 1400 may be defined. For example, the radio interface protocol may be divided into a physical layer, a data link layer, a network layer, and the like which are vertically configured.

The radio interface protocol may be divided into a user plane and a control plane. Here, the control plane may be a plane for control signal transmission. The control signal may be referred to as a signaling signal. The user plane may be a plane for user data transmission.

In an exemplary embodiment of the communication system, the communication system may include a base station 1410 and a terminal 1430. For example, the base station 1410 may correspond to an eNB, a gNB, or the like. The terminal 1430 may be referred to as a 'user equipment (UE)'. The communication system may include a repeater 1420 that relays wireless communications between the base station 1410 and the terminal 1430. The repeater 1420 may correspond to an RF repeater. The base station 1410, the repeater 1420, and the terminal 1430 of the communication system may be the same as or similar to the base station 1350, the repeater 1320, and the terminal 1340 described with reference to FIG. 13, respectively.

In the user plane of the radio interface protocol stack structure 1400 of the communication system, the base station 1410 and the terminal 1430 may include PHY layers 1412 and 1432 included in a layer 1 (L1), MAC layers 1413 and 1433 included in a layer 2 (L2), radio link control (RLC) layers 1414 and 1434, packet data convergence protocol (PDCP) layers 1415 and 1435, and the like, respectively. On the other hand, in the control plane of the protocol stack structure 1400, the base station 1410 and the terminal 1430 may include PHY layers 1412 and 1432 included in a L1, MAC layers 1413 and 1433 included in a L2, RLC layers 1414 and 1434, PDCP layers 1415 and 1435, RRC layers 1416 and 1436 included in a layer 3 (L3), and the like, respectively. The base station 1410 and the terminal 1430 may perform radio signal transmission/reception through RF functions 1411 and 1431.

Meanwhile, in the user plane and the control plane of the protocol stack structure 1400, the RF repeater 1420 may not include the layers such as the PHY layer to the RRC layer, may receive and amplify signals transmitted from the base station 1410 and the terminal 1430 based on the RF function 1421, and may transmit or retransmit the amplified signals. In other words, in the user plane and the control plane of the protocol stack structure 1400, the layers such as the PHY layer to the RRC layer of the repeater 1420 may be transparent, and the radio signal received at the repeater may be amplified, transmitted, and/or retransmitted in terms of the RF function 1421.

In exemplary embodiments of a repeater, such as the repeater 1320 described with reference to FIG. 13 and the repeater 1420 described with reference to FIG. 14, the repeater may repeatedly perform reception, amplification, transmission and/or retransmission operations for the RF signal simply based on the RF function, an RF signal. In this case, the complexity and cost of implementing the repeater and the communication system including the repeater may be low.

Meanwhile, in exemplary embodiments of a repeater such as the repeater 1320 described with reference to FIG. 13 and the repeater 1420 described with reference to FIG. 14, the base station and the communication network may not be able to secure control over the repeater. In this case, the performance of the repeater may be limited in the FR2 band requiring multi-beam operations. For example, in order to improve signal quality in the FR2 band and to control the amount of interference on a communication path, explicit or implicit management and indication operations for the repeater beams may be required. However, for a repeater including only a simple RF function, explicit or implicit management and indication operations for the repeater beams may not be performed. A technique for improving the performance of the repeater in the FR2 band requiring multi-beam operations may be required.

Figure 15:
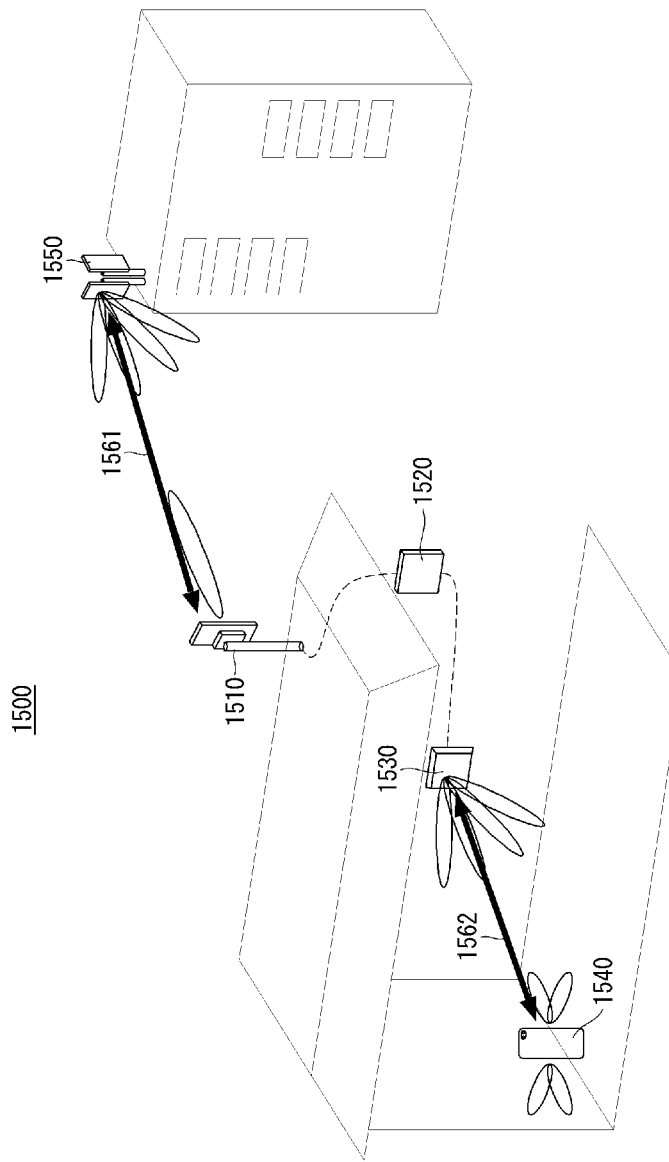
FIG. 15 is a conceptual diagram illustrating a second exemplary embodiment of a signal transmission/reception method based on a wireless repeater in a communication system.

FIG. 15 is a conceptual diagram illustrating a second exemplary embodiment of a signal transmission/reception method based on a wireless repeater in a communication system.

Referring to FIG. 15, a communication system 1500 may include one or more communication nodes. For example, the communication system 1500 may include one or more base stations and one or more terminals. The communication system 1500 may include one or more repeaters that relay communications between one or more communication nodes. FIG. 15 shows an exemplary embodiment in which one repeater relays communications between one base station existing outdoors and one terminal existing indoors. However, this is only an example for convenience of description, and exemplary embodiments of the present disclosure are not limited thereto. For example, an exemplary embodiment of the communication system 1500 may include a plurality of base stations, terminals, and/or repeaters to perform mutual communications. Hereinafter, in describing a second exemplary embodiment of a signal transmission/reception method based on a wireless repeater in the communication system with reference to FIG. 15, content overlapping with those described with reference to FIGS. 1 to 14 may be omitted.

In an exemplary embodiment of the communication system 1500, a repeater 1520 including an outdoor antenna 1510 and an indoor antenna 1530 may relay a radio signal received in an outdoor space to an indoor space. Alternatively, the repeater 1520 may relay a radio signal received in the indoor space to the outdoor space. The outdoor antenna 1510 may be referred to as a 'first antenna', and the indoor antenna 1520 may be referred to as a 'second antenna'. Here, the repeater 1520 may be a repeater having advanced or enhanced functions than the RF repeater 1320 described with reference to FIG. 13. The repeater 1520 described with reference to FIG. 15 may be referred to as an 'advanced repeater'. In an exemplary embodiment of the communication system 1500, the advanced repeater 1520 may support a signal transmission/reception operation through multiple beams, unlike the simple RF repeater.

The repeater 1520 may relay communications between a terminal 1540 located indoors and a base station 1550 located outdoors. Hereinafter, configurations related to an operation in which the repeater 1520 relays a downlink signal transmitted from the base station 1550 will be described as an example. However, this is only an example for convenience of description, and exemplary embodiments of the present disclosure are not limited thereto. For example, exemplary embodiments of the present disclosure may be equally or similarly applied to an operation in which the repeater 1520 relays an uplink signal transmitted from the terminal 1540.

When multi-beam-based communication is performed because an operating frequency band such as the FR2 band is high or the number of antennas of the base station, the terminal, and/or the repeater is high, in operations of a beam of the first antenna 1510 provided for communications with the base station 1550, not only a physical position of the base station 1550 but also directions of transmission and reception beams to be used by the base station 1550 may need to be considered together. Meanwhile, in operations of a beam of the second antenna 1530 provided for communications with the terminal 1540, not only a physical position of the terminal 1540 but also directions of transmission and reception beams to be used by the terminal 1540 may need to be considered together.

On a communication path from the base station 1550 to the terminal 1540 through the repeater 1520, a link between the base station 1550 and the repeater 1520 may be defined as a 'first link' 1561 or a 'link #1' 1561. On the other hand, a link between the repeater 1520 and the terminal 1540 may be defined as a 'second link' 1562 or a 'link #2' 1562.

Communications based on one or more transmission and reception beams may be performed in each of the first link 1561 and the second link 1562. When the number of beams that can be used in the first link 1561 is '$B_1$' and the number of beams that can be used in the second link 1562 is '$B_2$', the total number of beam types that can be applied on the communication path from the base station 1550 to the terminal 1540 through the repeater 1520 may be calculated as '$B_1 \times B_2$'.

More specifically, when the number of transmission beams of the base station 1550 is $B_{11}$, the number of reception beams of the first antenna 1510 is $B_{12}$, the number of transmission beams of the second antenna 1530 is $B_{21}$, and the number of reception beams of the terminal 1540 is $B_{22}$, '$B_1 = B_{11} \times B_{12}$' or '$B_2 = B_{21} \times B_{22}$' may be established. When the base station 1550 wants to transmit a downlink signal to the terminal 1540 through a beam, the total number of types of reception beams for receiving the beam transmitted from the base station 1550 may be calculated as '$B_{12} \times B_{21} \times B_{22}$'.

The number of reception beams of the terminal 1540 may be reported to the base station 1550 through a terminal capability report. When the base station 1550 intends to transmit a beam based only on the terminal capability report, since the beam is transmitted in a state in which information on a beam-related capability of the repeater 1520 is not obtained, there may be a risk that reception beam indication is not easy or a risk that a large amount of communication resources are consumed in the reception beam indication. In other words, in order for the base station 1550 to transmit a downlink signal to the terminal 1540 through the repeater 1520 supporting multiple beams, the base station 1550 may need to receive a capability report including beam-related capability information of the repeater 1520.

Figure 16A:
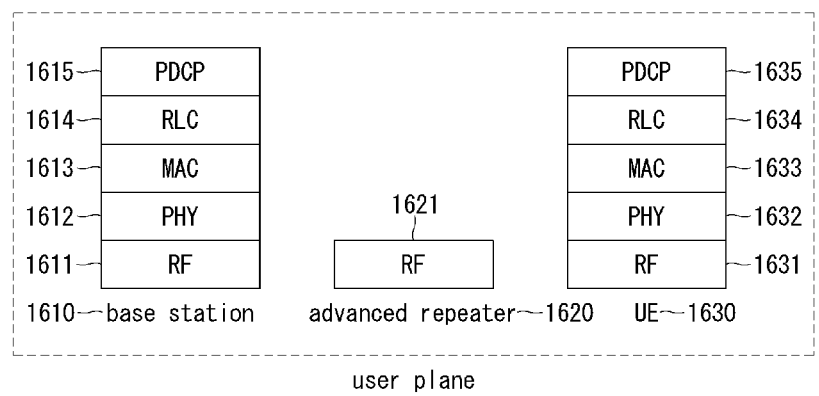
FIGS. 16A and 16B are conceptual diagrams illustrating a second exemplary embodiment of a user plane and a control plane in a communication system including a wireless repeater.
Figure 16B:
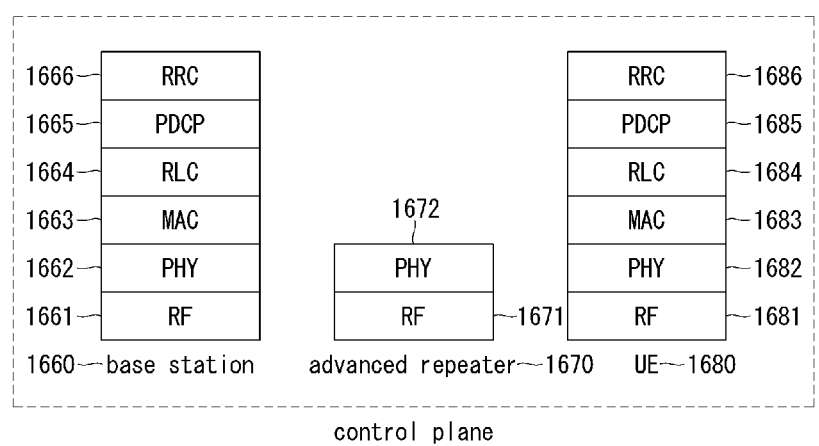

FIGS. 16A and 16B are conceptual diagrams illustrating a second exemplary embodiment of a user plane and a control plane in a communication system including a wireless repeater.

Referring to FIGS. 16A and 16B, in a radio connection section between communication nodes, a radio interface protocol or a radio interface protocol stack structure 1600 or 1650 may be defined. The radio interface protocol may be divided into a user plane and a control plane. Hereinafter, in describing the second exemplary embodiment of the user plane and the control plane in the communication system with reference to FIGS. 16A and 16B, the content overlapping with those described with reference to FIGS. 1 to 15 may be omitted.

In an exemplary embodiment of the communication system, the communication system may include base stations 1610 and 1660 and terminals 1630 and 1680. The communication system may include repeaters 1620 and 1670 that relay wireless communications between the base stations 1610 and 1660 and the terminals 1630 and 1680. The base stations 1610 and 1660, the repeaters 1620, 1670, and the terminals 1630 and 1680 of the communication system may be the same as or similar to the base station 1550, the repeater 1520, and the terminal 1540 described with reference to FIG. 13, respectively. That is, the repeater 1620 may be the same as or similar to the 'advanced repeater' described with reference to FIG. 15.

Referring to FIG. 16A, in the user plane 1600 of the radio interface protocol stack structure of the communication system, the base station 1610 and the terminal 1630 may include PHY layers 1612 and 1432, MAC layers 1613 and 1633, RLC layers 1614 and 1434, PDCP layers 1615 and 1635, and the like, respectively. In an exemplary embodiment of the communication system, in the user plane 1600 of the radio interface protocol stack structure of the communication system, the base station 1610 and the terminal 1630 may further include RRC layers (not shown). The base station 1610 and the terminal 1630 may perform radio signal transmission/reception through RF functions 1611 and 1631, respectively. In the user plane 1600 of the protocol stack structure, the repeater 1620 may not include the layers such as the PHY layer to the PDCP layer, and may receive and amplify signals transmitted from the base station 1610 and the terminal 1630 based on the RF function 1621, and may transmit or retransmit the amplified signals. In the user plane 1600 of the protocol stack structure, the layers such as the PHY layer to the RRC layer of the repeater 1620 may be transparent, and the radio signals received by the repeater 1620 may be amplified, transmitted, and/or retransmitted in terms of the RF function 1621.

On the other hand, referring to FIG. 16B, in the control plane 1650 of the protocol stack structure, the base station 1660 and the terminal 1680 may include PHY layers 1662 and 1682, MAC layers 1663 and 1683, RLC layers 1664 and 1684, PDCP layers 1665 and 1685, RRC layers 1666 and 1686, and the like, respectively. The base station 1660 and the terminal 1680 may perform radio signal transmission/reception through RF functions 1661 and 1681, respectively. In the control plane 1650 of the protocol stack structure, the repeater 1670 may further include a PHY layer 1672 in addition to an RF function 1671. The PHY layer 1672 of the repeater 1670 corresponding to an advanced repeater may be used for management operations of the base station 1660 for the repeater 1670. For example, the PHY layer 1672 of the repeater 1670 may process information for reporting capability of the repeater 1670, or information for management and indication of the base station 1660 for beams of the repeater 1660. When the repeater 1670 performs an operation based on the PHY layer 1672 rather than simply performing an operation based on the RF function 1671 in the control plane 1650 of the protocol stack structure, the base station 1660 may control a beam or a combination of beams in the first link 1561 and/or the second link 1562 described with reference to FIG. 15.

Figure 17:
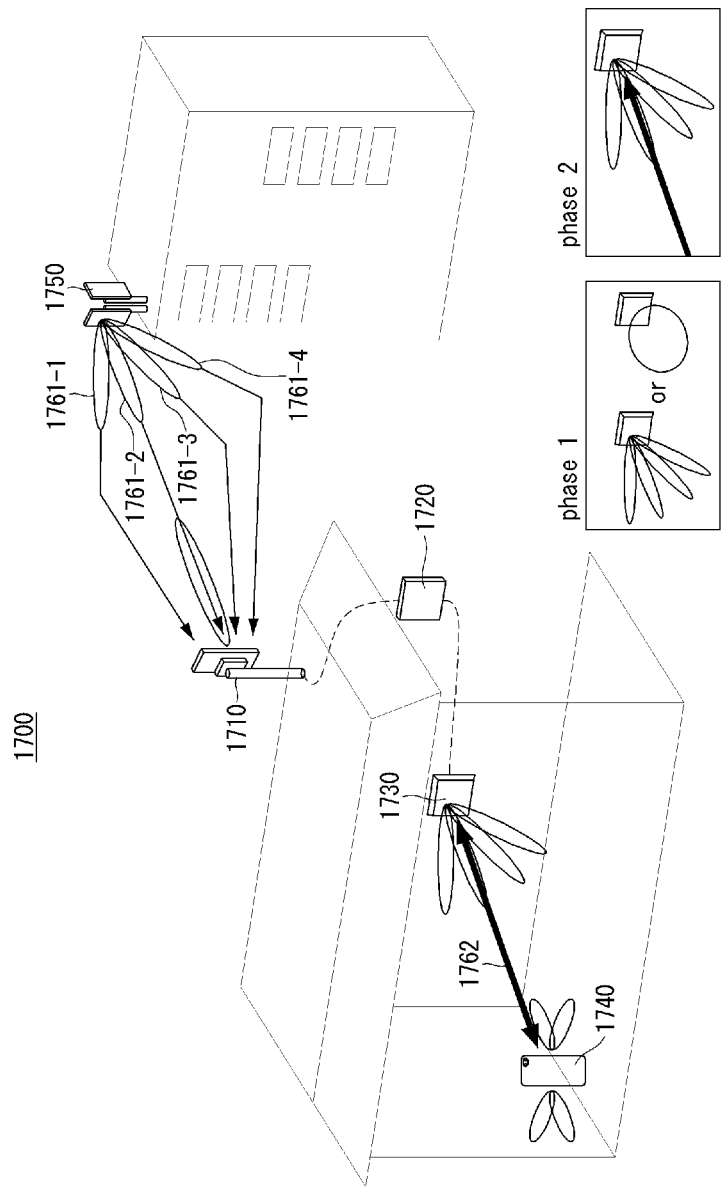
FIG. 17 is a conceptual diagram for describing an exemplary embodiment of a method for a base station to control beams of a repeater in a communication system.

FIG. 17 is a conceptual diagram for describing an exemplary embodiment of a method for a base station to control beams of a repeater in a communication system.

Referring to FIG. 17, a communication system 1700 may include one or more communication nodes. For example, the communication system 1700 may include one or more base stations, one or more terminals, and one or more repeaters. FIG. 17 shows an exemplary embodiment in which one repeater relays communications between one base station existing outdoors and one terminal existing indoors. However, this is only an example for convenience of description, and exemplary embodiments of the present disclosure are not limited thereto. A repeater 1720, a base station 1750, and a terminal 1740 shown in FIG. 17 may be the same or similar to the repeaters 1520, 1620, and 1670, the base stations 1550, 1610, and 1660, and the terminals 1540, 1630, and 1680 described with reference to FIGS. 15 and 16, respectively. Hereinafter, in describing the first exemplary embodiment of a repeater beam control method of a base station in a communication system with reference to FIG. 17, the content overlapping with those described with reference to FIGS. 1 to 16 may be omitted.

A first link between the repeater 1720 and the base station 1750 may be comprised of one or more beams 1761-1, 1761-2, 1761-3, and 1761-4. In other words, the repeater 1720 may receive a downlink signal transmitted from the base station 1750 through one or more beams 1761-1, 1761-2, 1761-3, and 1761-4. The repeater 1720 may amplify some or all of signals received through the one or more beams 1761-1, 1761-2, 1761-3, and 1761-4, and may transmit the amplified signals through a second link 1762. Each of the one or more beams 1761-1, 1761-2, 1761-3, and 1761-4 constituting the first link (i.e., link #1) may be referred to as a beam #1-1 1761-1, a beam #1-2 1761-2, a beam #1-3 1761-3, or a beam #1-4 1761-4.

Reception qualities of the one or more beams 1761-1, 1761-2, 1761-3, and 1761-4 at the repeater 1720 may be the same or different from each other. The base station 1750 and/or the repeater 1720 may operate to perform mutual communications based on a beam having the highest reception quality or higher than or equal to a predetermined quality threshold. For example, when the reception quality of the beam 1761-2 is the best among the one or more beams 1761-1, 1761-2, 1761-3, and 1761-4, the base station 1750 and/or the repeater 1720 may perform control on communications in the first link based on the beam 1761-2.

First Exemplary Embodiment of Communication System

In a first exemplary embodiment of the communication system, configurations related to an operation in which the base station recognizes repeater beam(s) and operations of indicating use of the repeater beam(s) recognized by the base station are proposed.

The repeater 1720 may be classified into several categories according to a beam management method.

Repeater Category #1: The repeater 1720 belonging to a category #1 may use a wide beam when transmitting some signals in the second link 1762, and may use a terminal-specific beam (or, UE-specific beam) when transmitting other signals. Here, the 'wide beam' may mean an omni-directional beam, an omni-beam, a cell-specific beam, a repeater-specific beam, a relay-specific beam, a single beam, or the like. Some signals transmitted through a wide beam may include at least one of SSB, CORESET #0, CORESET, CSI-RS (e.g., used for tracking), or signals used for a random access channel (RACH) procedure. A frequency resource or a time resource in which some signals transmitted through a wide beam are transmitted may be referred to as 'phase 1' or 'step 1'. On the other hand, a frequency resource or a time resource in which some signals transmitted through a terminal-specific beam are transmitted may be referred to as 'phase 2' or 'step 2'. For example, in an exemplary embodiment of the communication system 1700, resources of the phase 1 may be differentiated from and configured not to overlap with resources of the phase 2. The resources of the step 1 may be differentiated from and configured not to overlap with resources of the step 2.

For example, when the repeater 1720 belonging to the category #1 transmits an SSB based on a wide beam, it may not be easy or may be impossible that the repeater 1720 or the base station 1750 obtain information on beams of the second link 1762 based on SSB reception information of the terminal 1740 such as RSRP, RSRQ, SINR, etc. Instead, the repeater 1720 or the base station 1750 may need to obtain information on beams of the second link 1762 by performing reception beam sweeping, etc. based on an uplink signal transmitted from the terminal 1740, such as PRACH and SRS. The repeater 1720 may configure a terminal-specific beam based on information on beams of the second link 1762 obtained through an uplink signal transmitted from the terminal 1740, such as PRACH or SRS. The repeater 1720 may transmit a radio signal based on a terminal-specific beam to the terminal 1740 through resources of the phase 2 and/or the step 2.

Repeater Category #2: The repeater 1720 belonging to a category #2 may use a narrow beam when transmitting some signals in the second link 1762, and may use a terminal-specific beam when transmitting other signals. Here, the 'narrow beam' may mean a directional beam, a sector-specific beam, a multi-beam, or the like. Here, the narrow beam and the terminal-specific beam may have the same or similar beam width. For example, the narrow beam and the terminal-specific beam may have the same beam width by being generated based on the same transmission spatial filter coefficients or the same reception spatial filter coefficients.

In case of the repeater 1720 belonging to the category #2, the repeater 1720 may provide one or more beams (i.e., repeater transmission beams) transmitted through the second antenna 1730 for one beam (i.e., repeater reception beam) received from the base station 1750 through the first antenna 1710. Through this, the repeater 1720 may amplify a signal of the best one beam (e.g., signal of the second beam 1761-2) among the one or more beams 1761-1, 1761-2, 1761-3, and 1761-4 constituting the first link or signals for one or more beams having a quality superior to a predetermined quality threshold regardless of the location of the terminal 1740, and transmit the amplified signal(s) through the indoor antenna 1730. To this end, the repeater 1720 may refer to SSB configuration information of the base station 1750. Here, the SSB configuration information of the base station 1750 referred to by the repeater 1720 may include, for example, configuration information of an SSB transmission periodicity, an offset, an SSB burst, an SSB burst set, and the like. The repeater 1720 may maintain the transmission beam direction of the second antenna 1730 for SSBs having the same SSB index during a specific unit period (e.g., within one SSB burst) to be the same based on the referenced SSB configuration information. Meanwhile, even for SSBs having the same SSB index during a period exceeding a specific unit (e.g., in different SSB bursts or SSB burst sets), by differentiating the transmission beam direction from the second antenna 1730, beam sweeping of the repeater 1720 in the second link 1762 may be performed.

Here, when an SSB periodicity set by the base station 1750 is '$T_{SSB\_P}$' and the number of beams of the repeater 1720 is '$N_{BEAM\_RE}$', an effective SSB periodicity in consideration of all beams of the base station 1750 of the first link and the repeater 1720 of the second link may be implicitly calculated as '$T_{SSS\_P} \times N_{BEAM\_RE}$'. Alternatively, the SSB transmission periodicity may be set explicitly as '$T_{SSS\_P} \times N_{BEAM\_RE}$'. In this case, the base station 1750 may configure a CSI-RS indicating 'repetition=ON' to the terminal 1740, and the transmission beam of the base station 1750 in the first link may be fixed. On the other hand, the beams of the repeater 1720 may be configured to be modifiable, and specifically, the repeater 1720 may obtain or configure beam information for the second link 1760 by receiving measurement values (e.g., RSRP, RSRQ, SINR, etc.) of the terminal 1740 for the beams of the repeater 1720.

Repeater Category #3: The repeater 1720 belonging to a category #3 may use a narrow beam when transmitting some signals in the second link 1762, and may use a terminal-specific beam when transmitting some other signals. This may be the same as or similar to the repeater 1720 belonging to the category #2. On the other hand, the repeater 1720 belonging to the category #3 may include a function of adjusting or modifying the direction of the reception beams of the repeater 1720 in the first link. The repeater 1720 belonging to the category #3 may perform beam adjustment more flexibly or more dynamically than the repeater 1720 belonging to the category #2. In the repeater 1720 belonging to the category #3, the number of beams of the repeater 1720 (i.e., $N_{BEAM\_RE}$) may have a larger value than in the repeater 1720 belonging to the category #2. Alternatively, in the repeater 1720 belonging to the category #3, for the convenience of implementation, independent resources (e.g., time resources, frequency resources, processing times, guard intervals, etc.) may be requested and used for beam adjustment of the repeater 1720 in the first link and beam adjustment of the repeater 1720 in the second link 1762.

The base station 1750 may identify which category the repeater 1720 belongs to through a repeater capability report or a terminal capability report transmitted from the repeater 1720. The base station 1750 may perform a corresponding configuration operation based on the identified information on the category of the repeater 1720. Here, the category of the repeater 1720 is not limited to the category #1, category #2, category #3, or the like, and may include more various types of categories.

Second Exemplary Embodiment of Communication System

In a second exemplary embodiment of the communication system, configurations related to a repeater capability reporting operation or a terminal capability reporting operation for operations of the repeater are proposed.

Specifically, the repeater 1720 may report information related to beam implementation of the repeater 1720 to the base station through capability report signaling to assist beam management of the base station 1750 according to presence or absence of the repeater or the type of the repeater. Here, information related to the beam implementation of the repeater 1720 may be transmitted as a repeater capability report or a terminal capability report. If the repeater 1720 transmits information related to the beam implementation of the repeater 1720 as a repeater capability report to the base station 1750, the base station 1750 may recognize the repeater 1720 as one terminal. Alternatively, when the repeater 1720 transmits information related to the beam implementation of the repeater 1720 to the base station 1750 as a repeater capability report, the base station 1750 may recognize the repeater 1720 as one repeater. The repeater capability report transmitted by the repeater 1720 may be transmitted through capability report signaling independent of capability report signaling for a terminal capability report. The repeater capability report or the terminal capability report may include at least one of the following information.

The number of beams of the first link supported by the repeater ($N_{BEAM\_RE\_1}$):

The first link may be expressed as 'base station-repeater link', 'input ports', 'parent link', 'mother link', 'outdoor link', or the like. In an exemplary embodiment of the communication system, the repeater 1720 may manually adjust a single repeater beam of the first link to match a beam of the base station 1750. In this case, in the capability report of the repeater 1720, $N_{BEAM\_RE\_1}$ may be reported as '1'. In another exemplary embodiment of the communication system, the repeater 1720 may support a plurality of repeater beams in the first link, may be configured with a plurality of beams by the base station, may select one or more beams among the plurality of beams according to an indication of the base station 1750, and may use the selected one or more beams for communications with the base station 1750. In this case, in the capability report of the repeater 1720, $N_{BEAM\_RE\_1}$ may be reported as a value greater than '1'. The base station 1750 may configure a number of beams smaller than or equal to $N_{BEAM\_RE\_1}$ reported by the repeater 1720 as beams or a beam candidate group for the first link.

The number of beams of the second link supported by the repeater ($N_{BEAM\_RE\_2}$):

The second link 1762 may be expressed as a 'repeater-terminal link', 'output port(s)', 'child link', 'indoor link', or the like. In an exemplary embodiment of the communication system, the repeater 1720 may have a unidirectional repeater beam in the second link 1762. In this case, $N_{BEAM\_RE\_2}$ may be reported as '1'. In another exemplary embodiment of the communication system, the repeater 1720 may be configured with a plurality of repeater beams in the second link 1762, may select one or more beams among the plurality of repeater beams according to an indication of the base station 1750, and may use the selected one or more beams for communications with the terminal 1740. In this case, in the capability report of the repeater 1720, $N_{BEAM\_RE\_2}$ may be reported as a value greater than '1'. The base station 1750 may configure a number of beams smaller than or equal to $N_{BEAM\_RE\_2}$ reported by the repeater 1720 as beams or a beam candidate group for the second link.

The total number of beams supported by the repeater ($N_{BEAM\_RE\_total}$):

The repeater 1720 may report the total number of repeater beams (i.e., $N_{BEAM\_RE\_total}$) supported by the repeater (or supportable by the repeater) to the base station 1750 without an explicit distinction between the first link and the second link. Here, $N_{BEAM\_RE\_total}$ may be determined as in Equation 5.

$$N_{BEAM\_RE\_total} \le N_{BEAM\_RE\_1} \times N_{BEAM\_RE\_2} \quad \text{[Equation 5]}$$

The base station 1750 may configure a number of beams equal to or smaller than $N_{BEAM\_RE\_total}$ reported by the repeater 1720 to the repeater 1720, and the repeater 1720 may appropriately divide the configured beams into beams of the first link or beams of the second link, and use them.

Time taken to apply a beam indication of the base station (i.e., beam application time) ($T_{BEAM\_RE\_app}$):

According to the implementation of the repeater 1720, it may take more than a certain amount of time for the repeater 1720 to apply a beam indication after receiving control information (i.e., beam indication) indicating beam related matters transmitted from the base station 1750. When a time required for the repeater 1720 to apply the beam indication of the base station 1750 is $T_{BEAM\_RE\_app}$, the repeater 1720 may report information on $T_{BEAM\_RE\_app}$ to the base station 1750. For example, $T_{BEAM\_RE\_app}$ may be defined based on a time interval from the last time (e.g., OFDM symbol or slot) when the repeater 1720 receives the beam indication from the base station 1750 until the beam indication is applied. Here, the time interval may be defined based on various units such as an absolute time, the number of OFDM symbols, and the number of slots. Through this, the degree of freedom in implementing the repeater can be improved.

Whether multi-TRP scheme is applicable:

In an exemplary embodiment of the communication system, the repeater 1720 may operate as a multi transmission/reception point (multi-TRP). In other words, a 'multiple transmission/reception point scheme' or a 'multiple transmission/reception point' may be applied to the repeater 1720. The repeater 1720 to the multi-TRP scheme is applied may simultaneously perform transmissions and receptions for a plurality of base stations. On the other hand, the repeater 1720 to which the multi-TRP scheme is not applied may simultaneously perform transmission and reception for only one base station. The repeater 1720 may report, to one or more base stations, information on whether the multi-TRP scheme is applicable. The information on whether the multi-TRP scheme is applicable may include information on whether single frequency transmission (SFN) by multiple base stations is required. The information on whether the multi-TRP scheme is applicable may include information on whether the repeater 1720 can perform an operation such as synthesizing two or more beams.

Whether it is necessary to reinterpret a legacy terminal capability report:

When the base station 1750 supports a service for the terminal 1740 through the repeater 1720, the repeater 1720 may report, to the base station 1750, information on whether the content of the conventional terminal capability report or the legacy terminal capability report needs to be reinterpreted. For example, the legacy terminal capability report may include parameters related to beam correspondence (hereinafter, 'beam correspondence parameters'). Here, the beam correspondence parameters included in the legacy terminal capability report may indicate information on how requirements (hereinafter, 'beam correspondence requirements') such as a minimum peak equivalent isotropic radiated power (EIRP) of the terminal, a spherical coverage of the terminal, and a beam correspondence tolerance of the terminal can be satisfied. Specifically, the beam correspondence parameters may indicate information related to which condition the terminal 1740 corresponds to among the following two conditions.

Condition a): The beam correspondence requirements may be satisfied by an uplink beam autonomously selected (i.e., selected by the terminal) without explicit uplink beam sweeping.

Condition b): The beam correspondence requirements may be satisfied by explicit uplink beam sweeping.

The terminal 1740 may report information on the beam correspondence parameters to the base station 1750 through the legacy terminal capability report. For example, when the terminal 1740 corresponds to the condition a, the terminal 1740 may report a parameter 'beamCorrespondenceWithoutUL-BeamSweeping' to the base station 1750. On the other hand, when the terminal 1740 corresponds to the condition b, the terminal 1740 may not report the parameter 'beamCorrespondenceWithoutUL-BeamSweeping' to the base station 1750.

In case of the terminal corresponding to the condition b, for explicit configuration of uplink beam sweeping, the terminal capability report may be configured or promised to support an uplink beam management parameter uplinkBeamManagement. The type of the terminal may be classified according to whether the beam correspondence parameters and the uplink beam management parameter are supported. For example, the type of the terminal may be classified as shown in Table 5 according to whether the beam correspondence parameters and the uplink beam management parameter are supported.

TABLE 5

| Terminal type | Whether terminal capability supports | |
|---|---|---|
| | beamCorrespondenceWithoutUL-BeamSweeping | uplinkBeamManagement |
| Type 1 | ○ | X |
| Type 2 | ○ | ○ |
| Type 3 | X | ○ |

Referring to Table 5, it can be seen that a terminal corresponding to Type 1 does not support uplink beam management. Meanwhile, as described in relation to the first exemplary embodiment of the above-described communication system, in an exemplary embodiment of the repeater 1720, the uplink beam management function may be essential for obtaining and managing beam information of the repeater. If a specific repeater supports a terminal corresponding to Type 1 of Table 5, since the base station may not be able to identify information (i.e., maxNumberSRS-ResourcePerSet-BM, maxNumberSRS-ResourceSet) on the maximum number of SRS resources or SRS resource sets configurable to the corresponding terminal, a problem may arise in which the configurations according to the first exemplary embodiment of the communication system cannot be implemented. In this case, in order to implement the configurations according to the first exemplary embodiment of the communication system, it may be required to reinterpret the legacy terminal capability report.

When reinterpretation of the legacy terminal capability report is required, the repeater 1720 may report to the base station 1750 that reinterpretation of the legacy terminal capability report is required using the following methods.

Method 1): In the first method, when the repeater capability report or terminal capability report value of the repeater 1720 is required, an agreement for allowing the terminal capability report value of the terminal 1740 supported by the repeater 1720 to be overwritten (or, overridden) may be made. For example, when a repeater corresponding to Type 2 or Type 3 of Table 5 supports a terminal corresponding to Type 1 of Table 5, the base station may perform beam configuration according to the type of the repeater regardless of the type of the terminal.

Method 2): In case of a terminal supporting the advanced repeater described with reference to FIGS. 15 and 16B, an agreement for always reporting uplinkBeamManagement may be made. Through this, beam management performance for the advanced repeater connected to the terminal supporting the advanced repeater can be improved.

Third Exemplary Embodiment of Communication System

In a third exemplary embodiment of the communication system, configurations related to an operation in which a base station directly obtains beam information of a repeater or an operation in which a repeater reports obtained beam information to a base station are proposed.

First method for obtaining beam information of the repeater: The base station may use a CSI-RS to obtain beam information of the repeater. In a communication system to which 5G NR or the like is applied, a 'repetition' parameter may be provided during CSI-RS configuration. The terminal may refer to a value or configuration of the 'repetition' parameter for a CSI-RS resource set. For example, the terminal may identify that all CSI-RS resources in the CSI-RS resource set for which 'repetition="ON"' is configured have been transmitted by the base station using the same spatial TX filter. In this case, the terminal may search for an optimal reception beam by performing reception beam sweeping based on the CSI-RS resources. On the other hand, in case of CSI-RS resources in a CSI-RS resource set for which 'repetition="OFF"' is configured or 'repetition' parameter is not configured, the terminal may not assume that the base station performs transmissions using the same spatial TX filter. In other words, the terminal may assume that different base station beams are applied to the CSI-RS resources.

The first method for obtaining the repeater beam information described above may be extended to obtain beam information of a link between the base station and the terminal, which is configured as 'base station-repeater-terminal'. Table 6 is a table showing an exemplary embodiment of beam components for downlink and uplink of a link configured as 'base station-repeater-terminal'.

TABLE 6

| | Downlink | Uplink |
|---|---|---|
| First link (base station-repeater link) | Base station TX beam<br>Repeater RX beam | Base station RX beam<br>Repeater TX beam |
| Second link (repeater-terminal link) | Repeater TX beam<br>Terminal RX beam | Repeater RX beam<br>Terminal TX beam |

Referring to Table 6, each of downlink and uplink in a link configured as 'base station-repeater-terminal' may consist of up to four elements. In this case, each element constituting the downlink and the uplink in Table 6 may be configured variably based on the capability report of the repeater (i.e., the repeater capability report or the terminal capability report) and the beam configuration values of the base station according to the second exemplary embodiment of the above-described communication system. For example, in case of a repeater using a single repeater beam in the first link, elements such as 'repeater RX beam' and 'repeater TX beam' for the first link in Table 6 may be omitted. The base station may allow some elements for which beam information to be obtained to be configured variably, may allow other elements to be configured fixedly, and may obtain beam information for the elements allowed to be configured variably.

For example, in order to obtain the repeater beam information, a plurality of types of CSI-RS repetition may be defined as follows, and an agreement for determining a CSI-RS resource set may be made according to each type.

CSI-RS repetition type A: 'Base station TX beam fixed, repeater TX beam fixed, terminal RX beam variable'
CSI-RS repetition type B: 'Base station TX beam fixed, repeater TX beam variable, terminal RX beam fixed'
CSI-RS repetition type C: 'Base station TX beam fixed, repeater RX beam fixed, repeater TX beam fixed, terminal RX beam variable'
CSI-RS repetition type D: 'Base station TX beam fixed, repeater RX beam fixed, repeater TX beam variable, terminal RX beam fixed'

CSI-RS repetition type E: 'Base station TX beam fixed, repeater RX beam variable, repeater TX beam fixed, terminal RX beam fixed'

CSI-RS repetition type F: 'Base station TX beam fixed, repeater RX beam variable, repeater TX beam variable, terminal RX beam fixed'

The aforementioned CSI-RS repetition types A to F are merely examples for convenience of description, and exemplary embodiments of the present disclosure are not limited thereto. For example, in an exemplary embodiment of the communication system, only some of the aforementioned CSI-RS repetition types A to F may be defined and used, or additional types other than the aforementioned CSI-RS repetition types A to F may be defined and used. Alternatively, in an exemplary embodiment of the communication system, an agreement for applying different assumptions for downlink and uplink may be made.

Second method for obtaining repeater beam information:
The base station may use SSB(s) to obtain the repeater beam information. In a communication system to which the 5G NR is applied, when the terminal measures SSBs (or SSB occasions) that are transmitted in the same cell and have the same SSB index, there may be no special restrictions on a time domain averaging operation for improving reception performance. In other words, it can be seen that the terminal should maintain a reception beam for SSBs (or SSB occasions) that are transmitted in the same cell and have the same SSB index, regardless of the time domain.

In an exemplary embodiment of the communication system, a time-domain measurement restriction (TD-MR) may be introduced in the SSB measurement. The TD-MR may be promised or configured as one of intervals such as 'across SSB', 'across SSB burst', or 'across SSB burst set'. When the TD-MR for SSB is configured, the terminal may be restricted to perform time domain averaging for SSB only within a configured TD-MR interval. In this case, RSRP or SINR report values of terminals on SSB for the respective intervals may not be mixed or overlapped with each other. Accordingly, the repeater may operate to transmit or retransmit SSBs by applying different repeater beams for the respective intervals. In addition, an agreement may be made for the terminal to report information on in which interval a received signal quality was the best (e.g., an index of the interval in which the received signal quality was the best). Through this, the repeater or the base station may obtain explicit information about the repeater beam preference of the terminal.

Fourth Exemplary Embodiment of Communication System

In a fourth exemplary embodiment of the communication system, configurations related to an operation in which a base station indicates which repeater beam to be used based on obtained repeater beam information are proposed.

Figure 18:
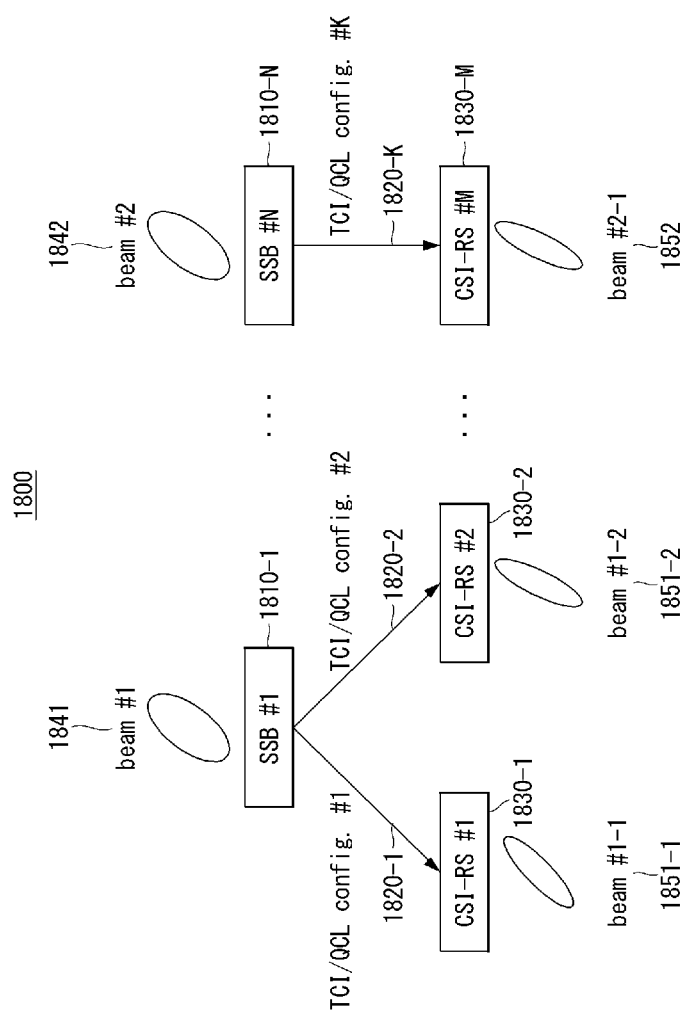
FIG. 18 is a conceptual diagram illustrating a first exemplary embodiment of a method of indicating TCI and QCL in a communication path between a base station and a terminal including a repeater in a communication system.

FIG. 18 is a conceptual diagram illustrating a first exemplary embodiment of a method of indicating TCI and QCL in a communication path between a base station and a terminal including a repeater in a communication system.

Referring to FIG. 18, in a communication system 1800, a base station may map a specific beam to a specific SSB, and may map one or more CSI-RSs to one or more beams having a narrower beam width than the beam mapped to the SSB within an area covered by the mapped SSB. For example, the base station may map a beam #1 1841 and a SSB #1 1810-1. The base station may map a CSI-RS #1 1830-1 and a CSI-RS #2 1830-2 to a beam #1-1 1851-1 and a beam #1-2 1851-2, respectively, within an area covered by the SSB 1810-1. A beam width of the beam 1851-1 and the beam 1851-2 may be narrower than or equal to a beam width of the beam 1841.

The base station may transmit information about a relationship between the beam 1841, beam 1851-1, and beam 1851-2 to terminals through one or more TCI/QCL configurations 1820-1 and 1820-2. For example, the base station may transmit, to the terminals, information that the beam 1851-1 and the beam 1851-2 correspond to the beam 1841, information that spatial RX parameters used for receiving the beam 1841 can be referred to when a signal transmitted through the beam 1851-1 and the beam 1851-2 is first received, or the like through the TCI/QCL configuration #1 1820-1 and the TCI/QCL configuration #2 1820-2. The terminal may refer to reception beam information of the SSB 1810-1 configured as a QCL reference when receiving the CSI-RS 1830-1 and the CSI-RS 1830-2 configured as QCL targets.

Here, a SSB beam and a CSI-RS beam associated with each other do not necessarily have to be different from each other. For example, the base station may map a beam #2 1842 to a SSB #N 1810-N. The base station may map one CSI-RS #M 1830-M to one beam #2-1 1852 within an area covered by the SSB 1810-N. A beam width of the beam 1852 may be narrower than or equal to a beam width of the beam 1842. The beam 1842 and the beam 1852 may be the same or different. The SSB 1810-N may be referenced by a single set of TCI/QCL configuration #K 1820-K.

Figure 19:
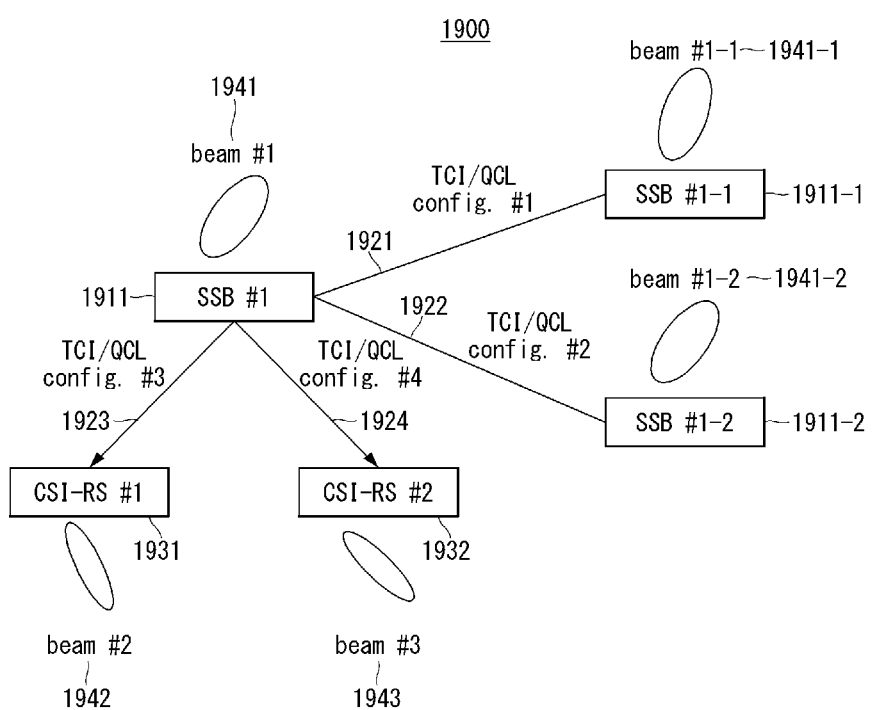
FIG. 19 is a conceptual diagram illustrating a second exemplary embodiment of a method of indicating TCI and QCL in a communication path between a base station and a terminal including a repeater in a communication system.

FIG. 19 is a conceptual diagram illustrating a second exemplary embodiment of a method of indicating TCI and QCL in a communication path between a base station and a terminal including a repeater in a communication system.

Referring to FIG. 19, there is the repeater on a communication path between the base station and the terminal, so that communications between the base station and the terminal may be relayed. The base station may transmit a SSB #1 1911 mapped to a beam #1 1941. The repeater may receive the SSB 1911 transmitted from the base station, and transmit or retransmit it as a repeater SSB #1-1 1911-1 and a repeater SSB #1-2 1911-2. The repeater SSB 1911-1 and the repeater SSB 1911-2 may be mapped to a repeater beam #1-1 1941-1 and a repeater beam #1-2 1941-2, respectively. The directions of the repeater beam 1941-1 and the repeater beam 1941-2 may or may not coincide with the direction of the beam 1941.

The base station may configure TCI/QCL configurations 1921 and 1922 related to the relationship between the SSB 1911 and the SSBs 1911-1 and 1911-2. Specifically, the base station may introduce the TCI/QCL configuration #1 1921 and the TCI/QCL configuration #2 1922 configuring the SSB 1911 as a QCL reference and configuring the SSBs 1911-1 and 1911-2 as QCL targets. Specifically, the base station may allow the repeater to transmit or retransmit the SSB 1911 as the SSBs 1911-1 and 1911-2 through the TCI/QCL configuration 1921 and the TCI/QCL configuration 1922. Alternatively, the base station may remove ambiguity of CSI feedback by indicating an explicit association between the SSB 1911 and the SSBs 1911-1 and 1911-2 through the TCI/QCL configuration 1921 and the TCI/QCL configuration 1922. The terminal may identify that the different SSBs (i.e., SSB 1911, SSB 1911-1, and SSB 1911-2) are included within one group composed of an original SSB and retransmission SSBs, based on higher layer signaling such as the TCI/QCL configuration 1921 and the TCI/QCL configuration 1922. In other words, when the base station indicates to the terminal an operation related to a specific SSB in the group (e.g., uplink beam indication, etc.), the terminal may perform the operation based on another SSB included in the same group depending on a situation.

The base station may configure CSI-RSs 1931 and 1932 having the SSB 1911 as a QCL reference to the terminal or the repeater. Here, the SSB 1911 may be transmitted by the base station, and the CSI-RS #1 1931 and the CSI-RS #2 1932 may be transmitted or retransmitted by the repeater. The directions of the beam 1941 applied to the SSB 1911 and a beam #2 1942 and a beam #3 1943 applied to the CSI-RSs 1931 and 1932 may not overlap each other. Here, a TCI/QCL configuration #3 1923 and a TCI/QCL configuration #4 1924 for configuring the SSB 1911 as a QCL reference and configuring the CSI-RSs 1931 and 1932 as QCL targets may include a flag or marker indicating that the QCL targets (or QCL reference) are signals transmitted or retransmitted by the repeater. Through this, the repeater or the terminal may identify that a signal referring to the TCI/QCL configuration 1923 and the TCI/QCL configuration 1924 is a signal for coverage extension.

One base station may simultaneously support a direct link between the base station and a terminal and a link between the base station and a terminal relayed through a repeater. That is, one base station may be configured to simultaneously support the TCI/QCL relationship described with reference to FIG. 18 and the TCI/QCL relationship described with reference to FIG. 19. In other words, the TCI/QCL relationship described with reference to FIG. 18 and the TCI/QCL relationship described with reference to FIG. 19 may coexist without being mutually exclusive.

Figure 20:
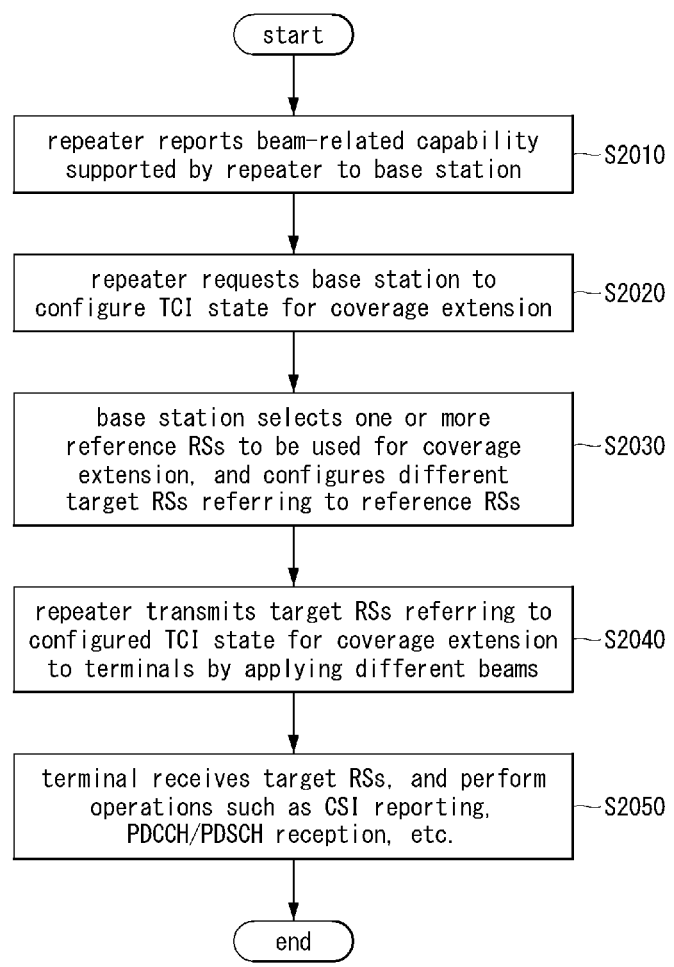
FIG. 20 is a flow chart illustrating a first exemplary embodiment of a signal transmission/reception method based on a wireless repeater in a communication system.

FIG. 20 is a flow chart illustrating a first exemplary embodiment of a signal transmission/reception method based on a wireless repeater in a communication system.

Referring to FIG. 20, communications between the base station and the terminal may be relayed through the repeater. Here, the base station, the repeater, and the terminal may perform operations for configuring and indicating a downlink beam. The operations shown in FIG. 20 may correspond to the operations for repeater beam indication described with reference to the fourth exemplary embodiment of the communication system.

The repeater may transmit a capability report including information on beam-related capability supported by the repeater to the base station (S2010). The capability report transmitted in the step S2010 may have a form of a repeater capability report or may have a form of a terminal capability report. The capability report transmitted in the step S2010 may include information such as the maximum number of transmission/reception beams, beam directions, and beam widths, which are supported by the repeater. The repeater capability reporting operation in the step S2010 may be performed through L1 signaling such as a PUCCH, RACH, and scheduling request (SR), or may be performed through higher layer signaling such as MAC CE signaling or RRC signaling.

The repeater may request the base station to configure TCI/QCL for coverage extension (S2020). Here, the TCI/QCL configuration may be the same as or similar to the TCI/QCL configurations 1921, 1922, 1923, and 1924 described with reference to FIG. 19. A signal transmitted by the repeater to request the TCI/QCL configuration from the base station may include information such as a beam direction to be extended, the number of terminals to be supported by the repeater, the number of beams to be supported by the repeater, and/or the like. The base station may select one or more QCL references (or reference RSs) to be used for coverage extension based on the request of the step S2020, and may configure one or more separate QCL targets (or target RSs) referring to the selected QCL references (S2030).

The repeater may transmit each of the QCL targets referring to the TCI/QCL configuration for coverage extension configured through the step S2030 to the terminal through a different beam (S2040). The terminal may receive the QCL targets and perform necessary operations such as CSI reporting, PDCCH/PDSCH reception, and decoding (S2050).

Figure 21A:
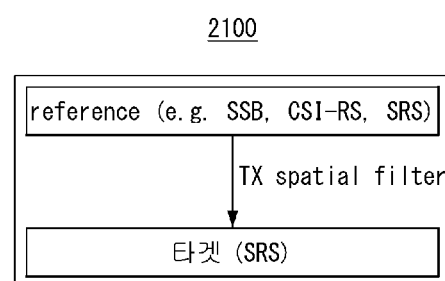
FIGS. 21A and 21B are conceptual diagrams for describing exemplary embodiments of a method of configuring and indicating spatial relation information in a communication system.
Figure 21B:
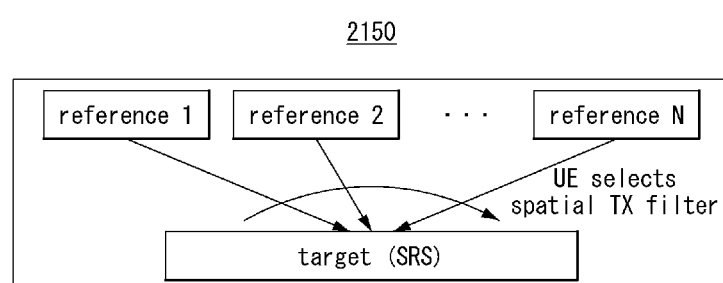

FIGS. 21A and 21B are conceptual diagrams for describing exemplary embodiments of a method of configuring and indicating spatial relation information in a communication system.

Referring to FIG. 21A, through a predetermined spatial relationship information configuration 2100, the base station may instruct a terminal to determine spatial RX filter values (i.e., uplink beam configuration values) for a target signal referring to the spatial relation information configuration 2100 with reference to one of a spatial RX filter used for receiving downlink signals such as SSB, CSI-RS, etc. and a spatial TX filter used for transmitting uplink signals such as SRS, etc. The spatial relationship information configuration 2100 may be configured such that one target refers to only one reference in order to prevent confusion in the terminal's uplink beam determination.

Meanwhile, when a repeater is introduced for coverage extension, the base station may not be able to accurately identify information on which uplink beam is an optimal beam in a link between the repeater and the terminal. In order to solve this, a spatial relation information configuration 2150 as shown in FIG. 21B may be used.

Specifically, based on the signaling structure between the base station and the repeater described with reference to FIG. 16, the base station may not be able to accurately identify information on which uplink beam is the optimal beam in the link between the base station and the terminal. In the spatial relation information configuration 2150 as shown in FIG. 21B, a plurality of references may be configured. The terminal may be permitted to select one optimal reference from among the plurality of references to select a spatial TX filter applied to a target corresponding to an SRS, a PUSCH antenna port, or the like. Such the permission may be explicitly indicated through a separate higher layer parameter, or the like, or may be implicitly indicated through the number of references (e.g., a plurality) in the spatial relation information configuration 2150.

Here, in consideration of the implementation complexity of the terminal and/or the repeater, the types of the plurality of references configured in the spatial relation information configuration 2150 may be unified. For example, the types of the plurality of references configured in the spatial relationship information configuration 2150 may be all uplink signals, all downlink signals, all SSBs, all CSI-RSs, or all SRSs.

The spatial relation information configurations 2100 and 2150 described with reference to FIGS. 21A and 21B may be replaced with other terms such as 'uplink TCI state configuration'.

Figure 22:
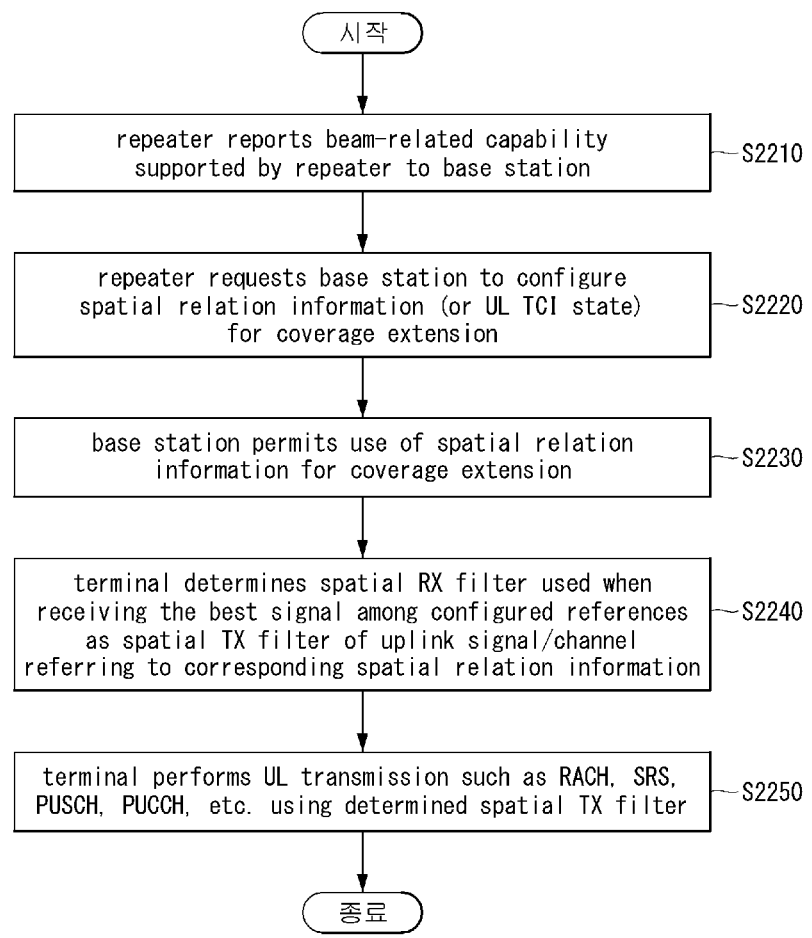
FIG. 22 is a flow chart illustrating a second exemplary embodiment of a signal transmission/reception method based on a wireless repeater in a communication system.

FIG. 22 is a flow chart illustrating a second exemplary embodiment of a signal transmission/reception method based on a wireless repeater in a communication system.

Referring to FIG. 22, communications between the base station and the terminal may be relayed through the repeater. Here, the base station, the repeater, and the terminal may perform operations for configuring and indicating a downlink beam. The operations shown in FIG. 22 may correspond to the operations for repeater beam indication described with reference to the fourth exemplary embodiment of the communication system.

The repeater may transmit a capability report including information on beam-related capability supported by the repeater to the base station (S2210). The capability report transmitted in the step S2210 may have a form of a repeater capability report or a form of a terminal capability report. The capability report transmitted in the step S2210 may include information such as the maximum number of transmission/reception beams, beam directions, and beam widths, which are supported by the repeater. Here, the 'maximum number of transmission/reception beams supported by the repeater' may mean the maximum number of transmission/reception beams that the repeater can support at the same time. The 'maximum number of transmission/reception beams supported by the repeater' may mean the maximum number of transmission/reception beams that the repeater can use simultaneously within a specific frequency band for each cell or cell group. The 'maximum number of transmission/reception beams supported by the repeater' may mean the maximum number of transmission/reception beams that the repeater can use within a specific time period such as one slot or one symbol.

The repeater may request the base station to configure spatial relation information for coverage extension (S2220). Here, the spatial relation information configuration may correspond to the spatial relation information configuration 2150 described with reference to FIG. 21B. In the step S2220, a signal transmitted by the repeater to request the base station to configure spatial relationship information may include information such as a beam direction to be extended, the number of terminals to be supported by the repeater, the number of beams to be supported by the repeater, and/or the like. The base station may perform spatial relationship information configuration for coverage extension based on the request of the step S2220 (S2230). For example, the base station may permit the repeater or the terminal to use spatial relation information for coverage extension by configuring a plurality of spatial relation information for one uplink signal or one uplink channel. Alternatively, the base station may permit the repeater or the terminal to use spatial relation information for coverage extension by configuring a plurality of references (or reference RSs) within one spatial relation information configuration.

The terminal may determine a spatial RX filter used when receiving the best signal among the references configured through the step S2230 as a spatial TX filter of an uplink signal or uplink channel referring to the corresponding spatial relation information (S2240). Here, the best signal among the references configured through the step S2230 may mean a signal having the highest reception power among the references configured through the step S2230. The terminal may transmit uplink signals such as a RACH, SRS, PUSCH, and PUCCH by using the determined spatial TX filter (S2250).

The 'spatial relations information configuration' described with reference to FIG. 22 may be replaced with other terms such as 'uplink TCI state configuration'.

Fifth Exemplary Embodiment of Communication System

In a fifth exemplary embodiment of the communication system, configurations related to an operation in which a repeater reuses a part of time/frequency resources of a base station beam for a repeater beam are proposed. Through the configurations proposed in the fifth exemplary embodiment of the communication system, the frequency efficiency related to the relaying operation of the repeater can be improved.

Figure 23:
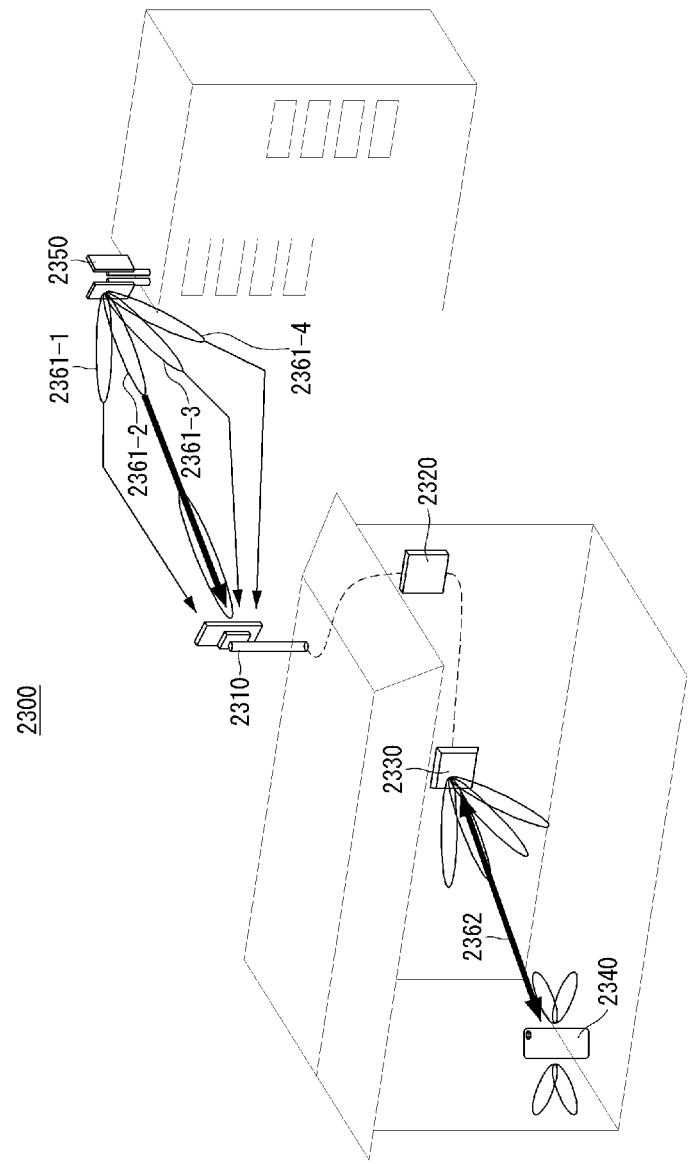
FIG. 23 is a conceptual diagram for describing an exemplary embodiment of a radio resource reuse method of a repeater in a communication system.

FIG. 23 is a conceptual diagram for describing an exemplary embodiment of a radio resource reuse method of a repeater in a communication system.

Referring to FIG. 23, a communication system 2300 may include one or more communication nodes. For example, the communication system 2300 may include one or more base stations and one or more terminals. FIG. 23 shows an exemplary embodiment in which one repeater relays communications between one base station existing outdoors and one terminal existing indoors. However, this is only an example for convenience of description, and exemplary embodiments of the present disclosure are not limited thereto. A repeater 2320, a base station 2350, and a terminal 2340 shown in FIG. 23 may be the same or similar to the repeater 1720, the base station 1750, and the terminal 1740 described with reference to FIG. 17, respectively. Hereinafter, in describing an exemplary embodiment of a radio resource reuse method of a repeater in the communication system with reference to FIG. 23, content overlapping with those described with reference to FIGS. 1 to 22 may be omitted.

The base station 2350 may configure and transmit a plurality of SSBs and CSI-RSs for multi-beam operations. In general, it may not be easy for the repeater to reuse radio resources (e.g., time resources or frequency resources) to which a beam of a different direction is applied for transmission or retransmission of a specific beam. On the other hand, in an exemplary embodiment of the communication system 2300, the repeater 2320 may be configured to reuse some of the resources occupied by the base station 2350 for a specific purpose in a specific situation, such as coverage extension of an indoor shadow area. This may be determined differently depending on a degree of physical shielding between the indoor communication environment and the outdoor communication environment.

For example, the repeater 2320 may relay communications between the base station 2350 and the terminal 2340 through a first antenna 2310 and a second antenna 2330. A link between the repeater 2320 and the base station 2350 may be referred to as a first link, and a link between the repeater 2320 and the terminal 2340 may be referred to as a second link. The first link between the repeater 2320 and the base station 2350 may be configured with one or more beams 2361-1, 2361-2, 2361-3, and 2361-4. In the time domain, the beams of the first link may be arranged in an order of the beam 2361-1, beam 2361-2, beam 2361-3, and beam 2361-4. The reception qualities of the one or more beams 2361-1, 2361-2, 2361-3, and 2361-4 constituting the first link may be the same or different from each other at the repeater 2320. The base station 2350 and/or the repeater 2320 may operate to perform mutual communications based on beam(s) having the highest reception quality or higher than or equal to a predetermined quality threshold. For example, when the reception quality of the beam 2361-2 is the best among the one or more beams 2361-1, 2361-2, 2361-3, and 2361-4, the base station 2350 and/or the repeater 2320 may perform control on communications in the first link based on the beam 2361-2.

Here, when performing transmission or retransmission for the beam 2361-2 in the second link 2362, the repeater 2320 may use radio resources (e.g., time resources, frequency resources, etc.) allocated to the beam 2361-2. On the other hand, when performing transmission or retransmission for the beam 2361-2 in the second link 2362, the repeater 2320 may further use radio resources (e.g., time resources, frequency resources, etc.) allocated to the remaining beams 2361-1, 2361-3, and 2361-4 except for the beam 2361-2 among the beams constituting the first link. Through this, a beam sweeping time for downlink repeater transmission beams or uplink repeater reception beams in the second link 2362 may be saved.

Here, considering buffering of the repeater 2320, when the repeater 2320 reuses the radio resources of the base station 2350, the repeater may be restricted to use only radio resources corresponding to a later time point than that of the beam 2361-2 to be transmitted or retransmitted. For example, the repeater 2320 may not use radio resources of the beam 2361-1 located before the beam 2361-2 in the time domain for the transmission or retransmission of the beam 2361-2, among the beams 2361-1, 2361-3, and 2361-4. On the other hand, the repeater 2320 may not use radio resources of the beam 2361-1 located before the beam 2361-2 in the time domain for the transmission or retransmission of the beam 2361-2, among the beams 2361-1, 2361-3, and 2361-4. On the other hand, the repeater 2320 may use radio resources of the beams 2361-3 and 2361-4 located after the beam 2361-2 in the time domain for the transmission or retransmission of the beam 2361-2, among the beams 2361-1, 2361-3, and 2361-4.

In an exemplary embodiment of the communication system 2300, in consideration of the implementation complexity of the repeater 2320, the repeater 2320 may be configured to reuse radio resources of the base station 2350 only when the repeater 2320 transmits some specific types of downlink signals among various types of downlink signals. For example, the repeater 2320 may be configured to reuse radio resources of the base station 2350 only when the repeater 2320 transmits SSB and CSI-RS among various types of downlink channels or downlink signals such as SSB, CSI-RS, DMRS, PDSCH, and PDCCH. This may be similarly applied to the case of uplink transmission. For example, the repeater 2320 may be configured to reuse radio resources of the base station 2350 only when the repeater 2320 transmits SRS among various types of uplink channels or uplink signals such as SRS, DMRS, PUSCH, and PUCCH.

Figure 24:
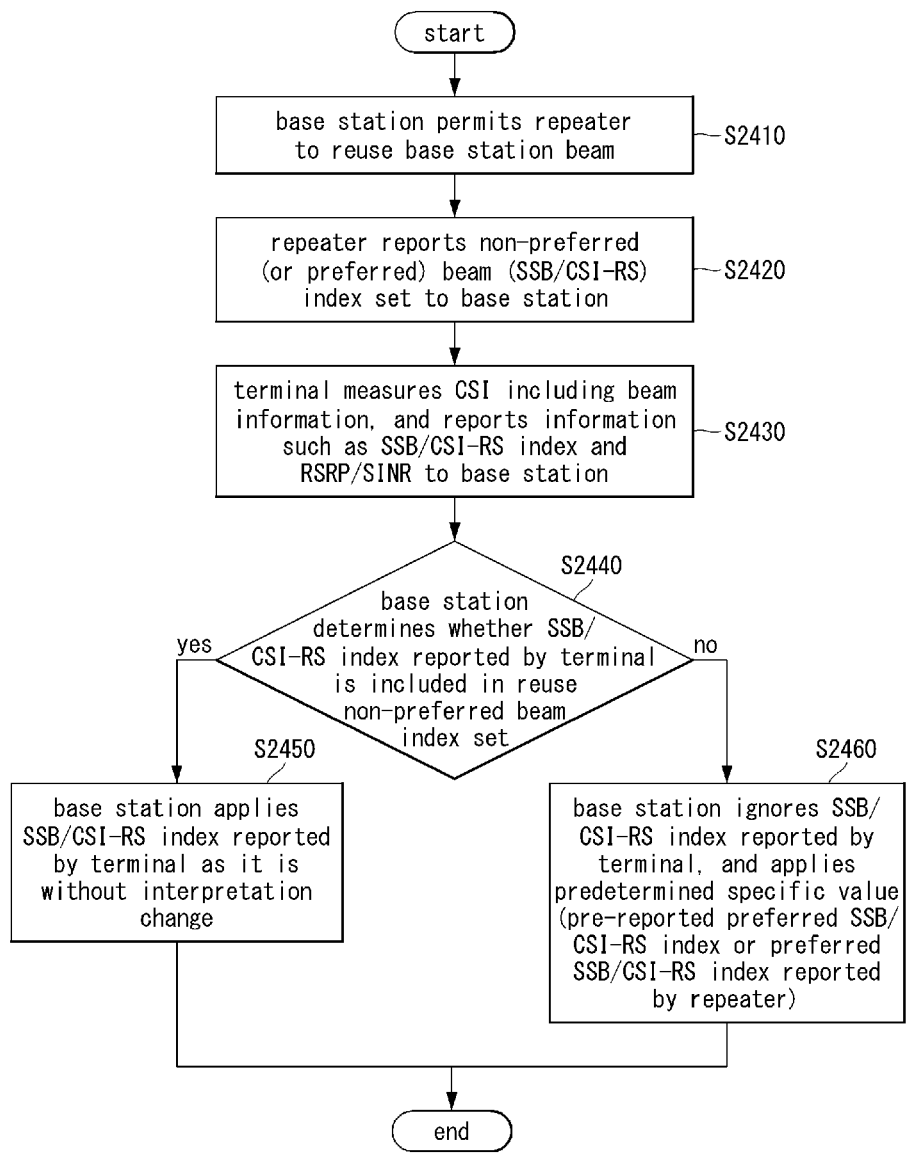
FIG. 24 is a flow chart for describing a third exemplary embodiment of a signal transmission/reception method based on a wireless repeater in a communication system.

FIG. 24 is a flow chart for describing a third exemplary embodiment of a signal transmission/reception method based on a wireless repeater in a communication system.

Referring to FIG. 24, the repeater may reuse a part of radio resources occupied by the base station when performing downlink signal relaying or uplink signal relaying. In other words, the repeater may reuse a base station beam when performing downlink signal relaying or uplink signal relaying. Here, the repeater may report a reuse preference for a base station radio resource or base station beam to the base station. A CSI report of the terminal may be interpreted based on the reuse preference report of the repeater.

Specifically, the base station may permit the repeater to reuse a base station beam (or radio resource) (S2410). Here, the permission according to the step S2410 may be performed through L1 signaling such as a PDCCH, or higher layer signaling such as MAC CE signaling and RRC signaling.

The repeater may report a reuse non-preferred beam index set to the base station based on the permission according to the step S2410 (S2420). Alternatively, the repeater may report a reuse preferred beam index set to the base station based on the permission according to the step S2410 (S2420). Here, the reuse non-preferred beam index set or the reuse preferred beam index set may correspond to a set of indexes for predetermined SSBs or CSI-RSs corresponding to preferred beams or non-preferred beams. Information on the reuse non-preferred beam index set or the reuse preferred beam index set may be transmitted to the base station through L1 signaling such as a PUCCH, or may be transmitted to the base station through higher layer signaling such as MAC CE signaling and RRC signaling. The reused non-preferred beam index set may be referred to as a 'non-preferred beam index set'. The reuse preference beam index set may be referred to as a 'preferred beam index set'.

In the step S2420, the non-preferred beam index set or the preferred beam index set may be reported for each bandwidth part (BWP), each cell, each cell group, and each frequency range (FR).

Here, the reuse non-preferred beam(s) or the reuse preferred beam(s) may be selected based on a reception result such as reception sensitivity for each beam in the repeater. For example, among base station beams, beams having low reception sensitivity in the repeater may be more suitable to be used for beam reuse. On the other hand, among the base station beams, beams having high reception sensitivity in the repeater may be more suitable to be used for coverage extension.

The repeater may select beams having a reception sensitivity lower than a predetermined first threshold in the repeater among the base station beams as the reuse preferred beams. Alternatively, the repeater may select beams having a reception sensitivity in the repeater higher than a predetermined second threshold among the base station beams as the reuse non-preferred beams.

On the other hand, the terminal may measure CSI including beam information, and may report information related to the measurement result to the base station (S2430). For example, the information reported to the base station in the step S2430 may include at least part of information such as an SSB index, CSI-RS index, RSRP, RSRQ, RSSI, SINR, TCI state index, spatial relation information index, SRS resource ID (SRI), and/or the like. The information reported to the base station in the step S2430 may be referred to as 'CSI report'.

If the SSB index and/or CSI-RS index indicated by the CSI report reported to the base station in the step S2430 corresponds to an index of a beam reused by the repeater, some interpretation changes may be required when the base station applies the content of the CSI report.

The base station may identify the information reported in the steps S2420 and S2430. The base station may identify the information on the reuse non-preferred beam(s) or the reuse preferred beam(s) reported from the repeater in the step S2420 and the information on the CSI report reported from the terminal in the step S2430. Here, the base station may identify whether the SSB index and/or CSI-RS index indicated by the CSI report reported in the step S2430 is included in the reuse non-preferred beam index set reported in the step S2420 (S2440). Alternatively, the base station may identify whether the index indicated by the CSI report reported in the step S2430 is included in the reuse preferred beam index set reported in the step S2420 (S2440). The base station may perform operations according to the following steps S2450 or S2460 based on the determination result of the step S2440.

Specifically, if the index indicated by the CSI report reported in the step S2430 is included in the reuse non-preferred beam index set reported in the step S2420, the base station may perform an operation according to the step S2450 below. Alternatively, if the index indicated by the CSI report reported in the step S2430 is not included in the reuse preferred beam index set reported in the step S2420, the base station may perform the operation according to the step S2450 below. In the step S2450, the base station may determine that the beam corresponding to the index indicated by the CSI report reported in the step S2430 is not reused by the repeater. The base station may apply the CSI report reported in the step S2430 as it is without an interpretation change.

On the other hand, if the index indicated by the CSI report reported in step S2430 is not included in the reuse non-preferred beam index set reported in the step S2420, the base station may perform an operation according to the step S2460 below. Alternatively, if the index indicated by the CSI report reported in the step S2430 is included in the reuse preferred beam index set reported in the step S2420, the base station may perform the operation according to step S2460 below. In the step S2460, the base station may determine that the beam corresponding to the index indicated by the CSI report reported in the step S2430 is reused by the repeater. When applying the CSI report reported in the step S2430, the base station may change the interpretation of the CSI report (S2460). For example, the base station may replace the index indicated by the CSI report reported in the step S2430 with a preset specific index value. In other words, the base station may ignore the index indicated by the CSI report reported in the step S2430 and apply the preset specific index value. Here, the 'preset specific index value' may correspond to a preferred beam index (e.g., an index of a preferred SSB and/or a preferred CSI-RS) reported from the repeater. Alternatively, the 'preset specific index value' may correspond to a preferred beam index reported or promised in a separate manner.

The base station may resolve the ambiguity caused by reusing a base station beam in the repeater based on auxiliary information such as non-preference or preference on a resource reuse, which is reported from the repeater, and may accurately interpret the contents of the CSI report reported by the terminal.

Figure 25:
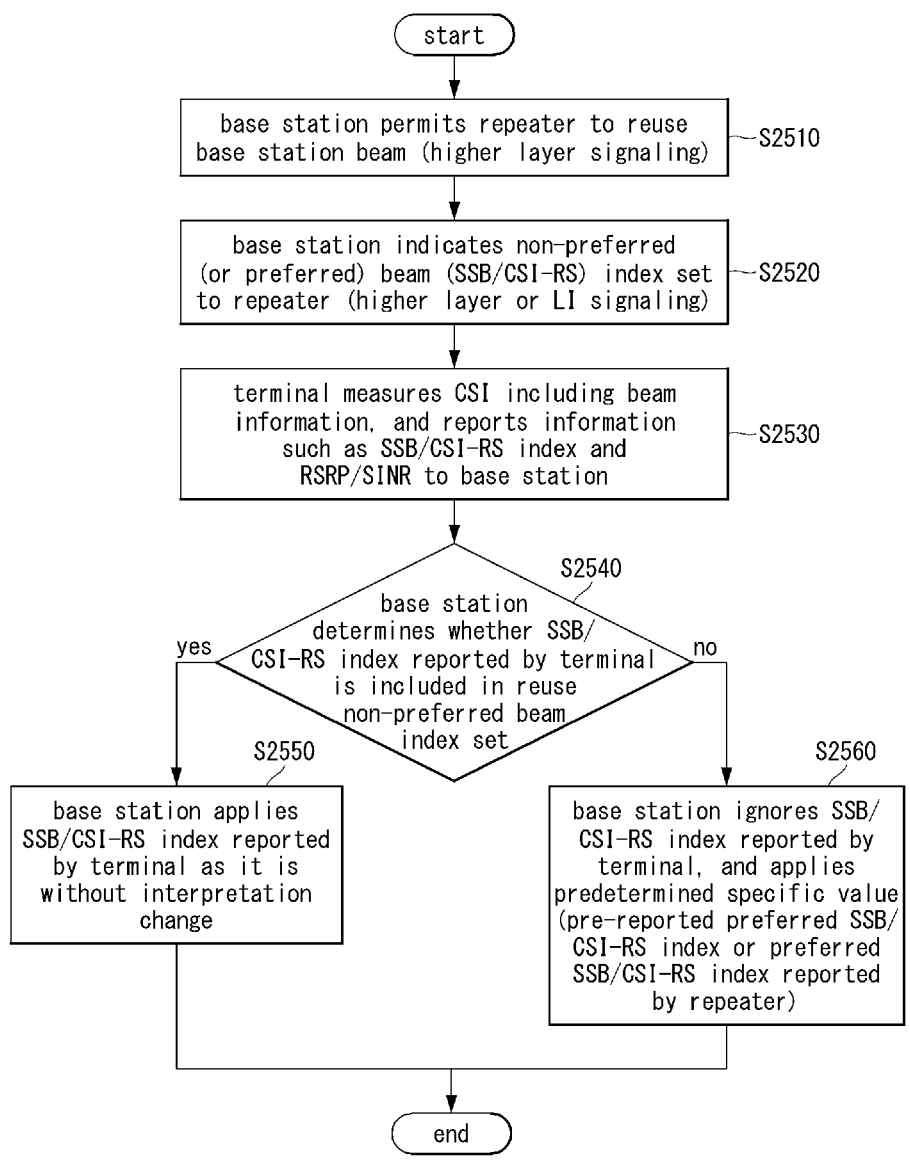
FIG. 25 is a flow chart illustrating a fourth exemplary embodiment of a signal transmission/reception method based on a wireless repeater in a communication system.

FIG. 25 is a flow chart illustrating a fourth exemplary embodiment of a signal transmission/reception method based on a wireless repeater in a communication system.

Referring to FIG. 25, the repeater may reuse a part of radio resources occupied by the base station when performing downlink signal relaying or uplink signal relaying. In other words, the repeater may reuse a base station beam when performing downlink signal relaying or uplink signal relaying. Here, the base station may permit the repeater to reuse a base station beam, and may indicate a reuse preference for a base station beam. Based on the indicated reuse preference for the base station beam as described above, a CSI report of the terminal may be interpreted.

Specifically, the base station may permit the repeater to reuse a base station beam (or radio resource) (S2510). Here, the permission according to the step S2510 may be performed through L1 signaling such as a PDCCH, or higher layer signaling such as MAC CE signaling and RRC signaling.

The base station may transmit information indicating reuse preferences for base station beams to the repeater. Specifically, the base station may indicate a reuse non-preferred beam index set to the repeater (S2520). Alternatively, the base station may indicate a reuse preferred beam index set to the repeater (S2520). Here, the reuse non-preferred beam index set or the reuse preferred beam index set may correspond to a set of indexes for predetermined SSBs or CSI-RSs corresponding to preferred beams or non-preferred beams. The information on the reuse non-preferred beam index set or the reuse preferred beam index set may be transmitted to the repeater through the same signaling as that used for the permission in the step S2510. Alternatively, the information on the reuse non-preferred beam index set or the reuse preferred beam index set may be transmitted to the repeater through signaling different from the signaling used for the permission in the step S2510.

If the base station indicates the reuse non-preferred beam index set, the repeater may not reuse beam(s) (or the corresponding SSB(s)/CSI-RS(s)) included in the indicated reuse non-preferred beam index set among the base station beams, and may reuse some of the remaining beams. On the other hand, if the base station indicates the reuse preferred beam index, the repeater may reuse beam(s) (or the corresponding SSB(s)/CSI-RS(s)) included in the indicated reuse preferred beam index set among the base station beams. The reuse non-preferred beam index set may be referred to as a 'non-preferred beam index set'. The reuse preferred beam index set may be referred to as a 'preferred beam index set'. The non-preferred beam index set or the preferred beam index set may be reported for each BWP, each cell, each cell group, and each FR.

On the other hand, the terminal may measure CSI including beam information, and may report information related to the measurement result to the base station (S2530). For example, the information reported to the base station in the step S2530 may include at least part of information such as an SSB index, CSI-RS index, RSRP, RSRQ, RSSI, SINR, TCI state index, spatial relationship information index, SRI, and the like. The information reported to the base station in the step S2530 may be referred to as 'CSI report'.

If the SSB index and/or CSI-RS index indicated by the CSI report reported to the base station in the step S2530 corresponds to an index of a beam reused by the repeater, some interpretation changes may be required when the base station applies the content of the CSI report.

The base station may compare the information indicated in the step S2520 with the information indicated in the step S2530. Specifically, the base station may identify the information on the reuse non-preferred beam(s) or the reuse preferred beam(s) reported from the repeater in the step S2520 and the information on the CSI report reported from the terminal in the step S2530. Here, the base station may identify whether the SSB index and/or CSI-RS index indicated by the CSI report reported in the step S2530 is included in the reuse non-preferred beam index set reported in the step S2520 (S2540). Alternatively, the base station may identify whether the index indicated by the CSI report reported in the step S2530 is included in the reuse preferred beam index set reported in the step S2520 (S2540). The base station may perform operations according to the following steps S2550 or S2560 based on the determination result of the step S2540.

Specifically, if the index indicated by the CSI report reported in the step S2530 is included in the reuse non-preferred beam index set reported in the step S2520, the base station may perform an operation according to the step S2550 below. Alternatively, if the index indicated by the CSI report reported in the step S2530 is not included in the reuse preferred beam index set reported in the step S2520, the base station may perform the operation according to the step S2550 below. In the step S2550, the base station may determine that the beam corresponding to the index indicated by the CSI report reported in the step S2530 is not reused by the repeater. The base station may apply the CSI report reported in the step S2530 as it is without an interpretation change.

On the other hand, if the index indicated by the CSI report reported in step S2530 is not included in the reuse non-preferred beam index set reported in the step S2520, the base station may perform an operation according to the step S2560 below. Alternatively, if the index indicated by the CSI report reported in the step S2530 is included in the reuse preferred beam index set reported in the step S2520, the base station may perform the operation according to step S2560 below. In the step S2560, the base station may determine that the beam corresponding to the index indicated by the CSI report reported in the step S2530 is reused by the repeater. When applying the CSI report reported in the step S2530, the base station may change the interpretation of the CSI report (S2560). For example, the base station may replace the index indicated by the CSI report reported in the step S2530 with a preset specific index value. In other words, the base station may ignore the index indicated by the CSI report reported in the step S2530 and apply the preset specific index value. Here, the 'preset specific index value' may correspond to a preferred beam index (e.g., an index of a preferred SSB and/or a preferred CSI-RS) reported from the repeater. Alternatively, the 'preset specific index value' may correspond to a preferred beam index reported or promised in a separate manner.

Sixth Exemplary Embodiment of Communication System

In a sixth exemplary embodiment of the communication system, configurations related to components of a physical layer control channel for implementing one or more of the first to fifth exemplary embodiments of the above-described communication system are proposed.

The L1 signaling transmitted from the base station to the repeater for the operations described through the first to fifth exemplary embodiments of the communication system may include at least one of the following pieces of information.

(1) The number of beams to be used by the repeater: This may mean the total number of beams that the repeater can change/use to improve the signal quality of the base station-repeater link and the repeater-terminal link. This value may be limited to the number of changeable beams within a specific time interval (e.g., one slot/subframe/frame, etc.). Alternatively, this value may be limited to the number of changeable/usable beams within a specific frequency section (e.g., one BWP/CC/cell group/FR, etc.).

The number of beams in the first link to be used by the repeater: This may mean the number of beams that the repeater can use to improve the signal quality of the base station-repeater link.

The number of beams in the second link to be used by the repeater: This may mean the number of beams that the repeater can use to improve the signal quality of the repeater-terminal link.

(2) Index (set) of beam(s) to be retransmitted by the repeater: This may mean an index (set) of base station beam(s) to be retransmitted by the repeater. Beams not indicated by this indicator may be interpreted as being not required to be retransmitted.

(3) Index (set) of beam(s) that the repeater should not retransmit: This may mean an index (set) of base station beam(s) that the repeater should not retransmit. Beams not indicated by this indicator may be interpreted as being required to be retransmitted.

(4) Whether it is possible to reinterpret a terminal capability report: As in the example of beam correspondence described in the second exemplary embodiment of the communication system, it may be indicated whether reinterpretation of a legacy terminal capability report for repeater beam management is possible.

(5) Repeater/terminal beam sweeping type: As in the example of the repeater/terminal beam sweeping type described in the third exemplary embodiment of the communication system, it may be indicated which beam among various beams in the base station-repeater-terminal link to sweep.

(6) Whether repeater beam sweeping is possible: This may explicitly indicate whether the repeater is capable of beam sweeping.

(7) Whether SSB/CSI-RS time domain measurement restriction (TD-MR) is applied: It may be possible to instruct the terminal not to accumulate channel measurement values in the time domain in order to prevent contamination of the terminal's channel estimation due to repeater beam sweeping.

(8) RSRP/RSRQ/RSSI/SNR/SINR threshold for resource reuse preference (non-preference) determination: A criterion for the repeater to determine whether to reuse a base station resource may be provided.

(9) Index set of resources to be reused (not reused) by the repeater: This may indicate a position of a resource or resource pool where the repeater can arbitrarily change a beam (or the repeater should not change the beam arbitrarily).

(10) Frequency resource indicator: A position of frequency resources to which the corresponding signaling is applied may be specified. For example, a RB set or group may be directly configured, a BWP or CC index may be indicated, a cell group such as a master cell group (MCG) or a secondary cell group (SCG) may be specified, or a frequency range such as FR1 or FR2 may be specified. The frequency resources may not be indicated only by one element, and in some cases, it is also possible to indicate the frequency resources with a plurality of elements, such as separately indicating the BWP index and the CC index.

(11) ACK/NACK indicator or indicator set for (beam) control information transmitted from the repeater to the base station

(12) Timing to apply the beam indication of the base station (beam application time): The base station may indicate to the repeater a time to actually apply the corresponding information after the repeater receives the beam indication control information of the base station. For example, the time may be defined based on various applications, such as an absolute time from the last OFDM symbol or slot in which the control information is received, the number of OFDM symbols, or the number of slots. Through this, repeaters having different implementation complexity may be controlled to follow a single rule.

(13) Whether a multi transmission/reception point (multi-TRP) scheme is applied: The base station may inform the repeater that multiple base stations support the repeater. This information may include whether SFN has been performed by multiple base stations, and the repeater may perform efficient transmission and reception, such as synthesizing and applying two or more beams, based on the information.

For the operations described through the first to fifth exemplary embodiments of the communication system, the L1 signaling transmitted from the base station to the repeater may be included in DCI transmitted on a PDCCH, for example, and a CRC of the DCI may be scrambled with a conventional RNTI such as C-RNTI or may be scrambled with an RNTI (e.g., repeater-RNTI, etc.) newly defined for the purpose of supporting the repeater. If a new RNTI is used, a value of the corresponding RNTI may be determined during initial access of the repeater to the base station or may be indicated through independent signaling.

For the operations described through the first to fifth embodiments of the communication system, the L1 signaling transmitted from the base station to the repeater does not necessarily have to be included in a single PDCCH, and may be transmitted on one or more PDCCHs when necessary. For example, a first PDCCH for repeater beam indication may indicate a beam pool (group) used by the corresponding repeater, and a second PDCCH for repeater beam indication may indicate a beam or beam set to be used at a specific time within the beam pool indicated by the first PDCCH. Similarly, it should be noted that some of the L1 signaling may be changed without obscuring the gist of the present disclosure to L2 signaling when actually applied.

For the operations described through the first to fifth exemplary embodiments of the communication system, the PDCCH including the L1 signaling transmitted from the base station to the repeater may be transmitted (or, monitored) only in a specific frequency band such as an initial BWP, CORESET #0 (refer to ControlResourceSetZero configuration), or the like for a purpose of reducing the implementation complexity of the repeater, or may be transmitted (or, monitored) only in a specific time interval such as a search space #0 (SearchSpaceZero). Similarly, the corresponding PDCCH may be promised to be transmitted using a specific numerology (e.g., numerology determined by referring to subCarrierSpacingCommon signaled by a MIB, or numerology determined as a predetermined value for each frequency band). For example, the specific numerology by which the corresponding PDCCH is transmitted may be determined with reference to subCarrierSpacingCommon signaled by the MIB, or may be determined as a predetermined value for each frequency band. Through this, the repeater may decode only a limited number of system information blocks (SIBs), such as MIB, SIB1, and SIB2, and perform PDCCH monitoring based thereon.

Meanwhile, the L1 signaling transmitted from the repeater to the base station for the operations described through the first to fifth exemplary embodiments of the communication system may include at least one of the following pieces of information.

(1) The maximum number of beams to be used by the repeater: This may mean the maximum number of beams that the repeater can change/use to improve the signal quality of the base station-repeater link and the repeater-terminal link. This value may be limited to the maximum number of changeable beams within a specific time interval (e.g., one slot/subframe/frame, etc.). Alternatively, this value may be limited to the maximum number of changeable/usable beams within a specific frequency section (e.g., one BWP/CC/cell group/FR, etc.).

The maximum number of beams in the first link to be used by the repeater: This may mean the maximum number of beams that the repeater can use to improve the signal quality of the base station-repeater link.

The maximum number of beams in the second link to be used by the repeater: This may mean the maximum number of beams that the repeater can use to improve the signal quality of the repeater-terminal link.

(2) Repeater capability report: As described in the second exemplary embodiment of the communication system, information on a repeater/terminal capability report for repeater beam management may be included.

(3) Report of preference on repeater/terminal beam sweeping type: As in the repeater/terminal beam sweeping type example described in the third exemplary embodiment of the communication system, a beam preferred by the repeater among various beams in the base station-repeater-terminal link may be reported.

(4) Reuse preference (non-preferred) resource index set of the repeater: The position of a resource or a resource pool for which the repeater wants to change a beam arbitrarily (or the repeater does not want to change a beam arbitrarily) may be reported.

(5) Frequency resource indicator: A position of frequency resources to which the corresponding signaling is applied may be specified. For example, a RB set or group may be directly configured, a BWP or CC index may be indicated, a cell group such as an MCG or SCG may be specified, or a frequency range such as FR1 or FR2 may be specified. The frequency resources may not be indicated only by one element, and in some cases, it is also possible to indicate the frequency resources with a plurality of elements, such as separately indicating the BWP index and the CC index.

(6) ACK/NACK indicator or indicator set for (beam) control information transmitted from the base station to the repeater (7) A request of applying a multi-TRP scheme: The base station may request the repeater to be supported by multiple base stations. This information may include whether SFN by multiple base stations is required, and may include information indicating whether the repeater can perform specific operations, such as synthesizing two or more beams.

For the operations described through the first to fifth exemplary embodiments of the communication system, the L1 signaling transmitted from the repeater to the base station may be included in, for example, UCI transmitted on a PUCCH, and the UCI may be transmitted in a conventional PUCCH format such as PUCCH formats 0 to 4, or transmitted in a new PUCCH format separately defined.

For the operations described through the first to fifth embodiments of the communication system, the L1 signaling transmitted from the repeater to the base station does not necessarily have to be included in a single PUCCH, and may be transmitted on one or more PUCCHs when necessary. Similarly, it should be noted that some of the L1 signaling may be changed without obscuring the gist of the present disclosure to L2 signaling when actually applied.

For the operations described through the first to fifth exemplary embodiments of the communication system, the PUCCH including the L1 signaling transmitted from the repeater to the base station may be transmitted only in a specific frequency band such as an initial BWP or a specific transmission cell (e.g., PCell, PSCell, etc.) within an MCG (or SCG) for the purpose of reducing the implementation complexity of the repeater, or may be transmitted only in a specific time interval preconfigured or promised. Similarly, the corresponding PUCCH may be promised to be transmitted using a specific numerology. For example, the specific numerology by which the corresponding PUCCH is transmitted may be determined with reference to subCarrierSpacingCommon signaled by the MIB, or may be determined as a predetermined value for each frequency band. Through this, the repeater may decode only a limited number of SIBs, such as MIB, SIB1, and SIB2, and perform PUCCH transmission based thereon.

The configurations described through the first to fifth exemplary embodiments of the communication system are not necessarily mutually exclusive, and the configurations proposed in the plurality of exemplary embodiments may be applied in combination. For example, the repeater may implement the configurations for base station resource reuse described with reference to the fifth exemplary embodiment of the communication system by using the beam indication method described with reference to the fourth exemplary embodiment of the communication system. The repeater may report information on whether to apply or not apply to each of the configurations described through the first to fifth exemplary embodiments of the communication system to the base station. Based on the information reported from the repeater, the base station may select one or more configurations to be applied to communications with the repeater or communications with the terminal through relaying of the repeater among the configurations described through the first to fifth exemplary embodiments of the communication system. The base station may indicate information on operations to be performed by the repeater through L1 signaling or higher layer signaling based on the one or more selected configurations.

Figure 26:
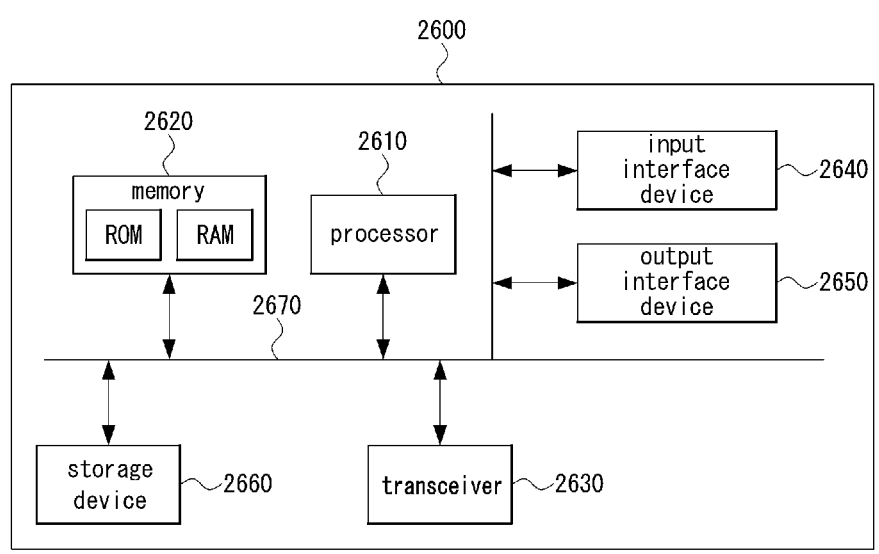
FIG. 26 is a block diagram illustrating an exemplary embodiment of a communication node constituting a communication system.

FIG. 26 is a block diagram illustrating an exemplary embodiment of a communication node constituting a communication system.

Referring to FIG. 26, a communication node 2600 may comprise at least one processor 2610, a memory 2620, and a transceiver 2630 connected to the network for performing communications. Also, the communication node 2600 may further comprise an input interface device 2640, an output interface device 2650, a storage device 2660, and the like. The respective components included in the communication node 2600 may communicate with each other as connected through a bus 2670.

However, each component included in the communication node 2600 may be connected to the processor 2610 via an individual interface or a separate bus, rather than the common bus 2670. For example, the processor 2610 may be connected to at least one of the memory 2620, the transceiver 2630, the input interface device 2640, the output interface device 2650, and the storage device 2660 via a dedicated interface.

The processor 2610 may execute a program stored in at least one of the memory 2620 and the storage device 2660. The processor 2610 may refer to a central processing unit (CPU), a graphics processing unit (GPU), or a dedicated processor on which methods in accordance with embodiments of the present disclosure are performed. Each of the memory 2620 and the storage device 2660 may be constituted by at least one of a volatile storage medium and a non-volatile storage medium. For example, the memory 2620 may comprise at least one of read-only memory (ROM) and random access memory (RAM).

The communication node 2600 may correspond to any one of communication nodes constituting the exemplary embodiments of the communication system described with reference to FIGS. 1 to 25. In an exemplary embodiment of the communication system, the communication node 2600 may correspond to a base station. For example, the communication node 2600 may perform the same or similar operations to those of the base station described with reference to FIGS. 24 and/or 25. The processor 2610 of the communication node 2600 may execute instructions for an operation of determining whether the repeater is to reuse a resource and an operation of instructing the repeater to reuse resources.

Meanwhile, in an exemplary embodiment of the communication system, the communication node 2600 may correspond to a repeater. For example, the communication node 2600 may perform the same or similar operations as those of the repeater described with reference to FIGS. 24 and/or 25. The processor 2610 of the communication node 2600 may execute instructions for an operation of interpreting a signal indicating whether to reuse a resource transmitted from the base station, and operations based on the interpreted signal.

Meanwhile, in an exemplary embodiment of the communication system, the communication node 2600 may correspond to a terminal. The communication node 2600 may perform the same or similar operations as those of the terminal described with reference to FIGS. 24 and/or 25. The processor 2610 of the communication node 2600 may execute instructions for an operation of identifying whether a resource is reused by the repeater, and operations of performing communications with the repeater and the base station based on the identified information on whether the repeater reuses the resource.

According to an exemplary embodiment of the present disclosure, in a FR2 band or a high frequency band, a base station and a terminal can effectively perform beam-based radio signal transmission and reception based on relaying of a wireless repeater.

According to an exemplary embodiment of the present disclosure, beam management on a path from the base station to the terminal through the repeater can be efficiently performed based on a signal transmission/reception operation between the base station, the repeater, and the terminal. Therefore, beam-based radio signal relaying performance based on the repeater can be improved at low cost.

However, the effects that can be achieved by the signal transmission and reception method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a repeater relaying wireless communications between a base station and a terminal in a communication system, the operation method comprising:

requesting, from the base station, permission to reuse radio resources allocated to one or more beams of a plurality of beams of the base station for beamforming for a link between the repeater and the terminal;

receiving, from the base station, a signal permitting to reuse radio resources allocated to one or more beams of the plurality of beams of the base station;

obtaining reuse preference information for the plurality of beams of the base station, which is determined based on a signaling signal transmission and reception operation with the base station;

receiving, from the base station, a first signal to be transmitted to the terminal;

transmitting, to the terminal, the first signal by using a first radio resource used for transmission of the first signal; and transmitting, to the terminal, the first signal by using a second radio resource selected based on the determined reuse preference information, wherein the obtaining of the reuse preference information comprises:

determining reuse preference for each of the plurality of beams of the base station; and transmitting, to the base station, the reuse preference information including information on the determined reuse preference for each of the plurality of beams through a first signaling signal.

2. The operation method according to claim 1, wherein the reuse preference information includes information on a reuse non-preferred beam index set, and the transmitting of the first signal to the terminal by using the second radio resource comprises:

identifying information on at least one beam that does not correspond to one or more indexes included in the reuse non-preferred beam index set among the plurality of beams of the base station;

selecting a radio resource allocated to the at least one beam as the second radio resource; and transmitting, to the terminal, the first signal by using the selected second radio resource.

3. The operation method according to claim 1, wherein the reuse preference information includes information on a reuse preferred beam index set, and the transmitting of the first signal to the terminal by using the second radio resource comprises:

identifying information on one or more beams corresponding to one or more indexes included in the reuse preferred beam index set among the plurality of beams of the base station;

selecting a radio resource allocated to the one or more beams corresponding to the one or more indexes as the second radio resource; and transmitting, to the terminal, the first signal by using the selected second radio resource.

4. The operation method according to claim 1, further comprising:

receiving, from the terminal, a first report including information on a result of receiving the first signal; and transmitting the first report to the base station.

5. A base station performing wireless communications with a terminal through relaying of a repeater in a communication system, the base station comprising:

a processor;

a memory electronically communicating with the processor; and instructions stored in the memory, wherein when executed by the processor, the instructions cause the base station to:

receive, from the repeater, a request for permission to reuse radio resources allocated to one or more beams of a plurality of beams of the base station for beamforming for a link between the repeater and the terminal;

transmit, to the repeater, a signal permitting reuse of the radio resources allocated to the one or more beams of the plurality of beams of the base station;

obtain reuse preference information for the plurality of beams of the base station, which is determined based on a signaling signal transmission and reception operation with the repeater;

transmit, to the repeater, a first signal to be transmitted to the terminal;

receive, from the repeater, a first report including information on a result of reception of the first signal at the terminal; and based on comparison of the reuse preference information and information included in the first report, determine whether an interpretation change for the first report is required.

6. The base station according to claim 5, wherein the reuse preference information includes information on a reuse non-preferred beam index set, and the instructions further cause the base station to:

compare a first beam index indicated by the first report with information of the reuse non-preferred beam index set; and when the first beam index is not included in the reuse non-preferred beam index set, determine that the interpretation change for the first report is required.

7. The base station according to claim 5, wherein the reuse preference information includes information on a reuse preferred beam index set, and the instructions further cause the base station to:

compare a first beam index indicated by the first report with information of the reuse preferred beam index set; and when the first beam index is included in the reuse preferred beam index set, determine that the interpretation change for the first report is required.

8. The base station according to claim 5, wherein the instructions further cause the base station to:

receive, from the repeater, the reuse preference information determined by the repeater through a first signaling signal; and identify information on whether to prefer reuse for each of the plurality of beams, which is included in the reuse preference information.

9. The base station according to claim 5, wherein the instructions further cause the base station to:

determine whether to prefer reuse for each of the plurality of beams; and transmit, to the repeater, the reuse preference information including information on reuse preference determined for each of the plurality of beams through a second signaling signal.

10. An operation method of a repeater relaying wireless communications between a base station and a terminal in a communication system, the operation method comprising:

requesting, from the base station, permission to reuse radio resources allocated to one or more beams of a plurality of beams of the base station for beamforming for a link between the repeater and the terminal;

receiving, from the base station, a signal permitting to reuse radio resources allocated to one or more beams of the plurality of beams of the base station;

obtaining reuse preference information for the plurality of beams of the base station, which is determined based on a signaling signal transmission and reception operation with the base station;

receiving, from the base station, a first signal to be transmitted to the terminal;

transmitting, to the terminal, the first signal by using a first radio resource used for transmission of the first signal; and transmitting, to the terminal, the first signal by using a second radio resource selected based on the determined reuse preference information, wherein the obtaining of the reuse preference information comprises:

receiving, from the base station, the reuse preference information determined by the base station through a second signaling signal; and identifying information on whether to prefer reuse for each of the plurality of beams, which is included in the reuse preference information.

11. The operation method according to claim 10, wherein the reuse preference information includes information on a reuse non-preferred beam index set, and the transmitting of the first signal to the terminal by using the second radio resource comprises:

identifying information on at least one beam that does not correspond to one or more indexes included in the reuse non-preferred beam index set among the plurality of beams of the base station;

selecting a radio resource allocated to the at least one beam as the second radio resource; and transmitting, to the terminal, the first signal by using the selected second radio resource.

12. The operation method according to claim 10, wherein the reuse preference information includes information on a reuse preferred beam index set, and the transmitting of the first signal to the terminal by using the second radio resource comprises:

identifying information on one or more beams corresponding to one or more indexes included in the reuse preferred beam index set among the plurality of beams of the base station;

selecting a radio resource allocated to the one or more beams corresponding to the one or more indexes as the second radio resource; and transmitting, to the terminal, the first signal by using the selected second radio resource.

13. The operation method according to claim 10, further comprising:

receiving, from the terminal, a first report including information on a result of receiving the first signal; and transmitting the first report to the base station.

* * * * *